United States Patent
Sugio et al.

(10) Patent No.: US 7,609,260 B2
(45) Date of Patent: Oct. 27, 2009

(54) IMAGE GENERATION PROGRAM PRODUCT AND IMAGE PROCESSING DEVICE

(75) Inventors: Naoki Sugio, Tokyo (JP); Hideaki Sekiya, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 391 days.

(21) Appl. No.: 11/634,720

(22) Filed: Dec. 5, 2006

(65) Prior Publication Data

US 2007/0126734 A1  Jun. 7, 2007

(30) Foreign Application Priority Data

Dec. 6, 2005  (JP) .............................. 2005-351462

(51) Int. Cl.
- G06T 17/40 (2006.01)
- G06T 15/00 (2006.01)
- G09G 5/00 (2006.01)
- G09G 5/02 (2006.01)
- A63F 13/00 (2006.01)

(52) U.S. Cl. ........................ 345/419; 345/581; 345/582; 345/589; 345/592; 382/165; 715/757

(58) Field of Classification Search ......... 345/418–419, 345/581–582, 589, 586, 549, 592; 382/162, 382/165, 285, 300; 715/200, 235, 706, 757; 463/3, 32–34

See application file for complete search history.

(56) References Cited

U.S. PATENT DOCUMENTS

2005/0153764 A1* 7/2005 Sterchi et al. .................. 463/3
2005/0239547 A1* 10/2005 Haga et al. .................... 463/30

FOREIGN PATENT DOCUMENTS

JP  11-073525 A  3/1999

* cited by examiner

Primary Examiner—Wesner Sajous
(74) Attorney, Agent, or Firm—Drinker, Biddle & Reath LLP

(57) ABSTRACT

This program product causes a computer to function as a unit for setting spectator information including the number of spectators belonging respectively to first and second spectator types, a unit for determining the number of spectators belonging to the respective spectator types to be allocated respectively to each area, a unit for determining the mixture ratio of the respective spectator types in each area, a unit for determining a polygon to be arranged in each area and mapped with a texture containing a plurality of spectators, a unit for determining color pallet data associated with the color of the texture so that the ratio of the spectators belonging respectively to the respective spectator types contained in the texture achieves a state according to the mixture ratio, a unit for mapping the texture defined based on the determined color pallet data to the polygon, and a unit for generating an image.

10 Claims, 18 Drawing Sheets

R1    R2

R1  R2

R1

IMAGE GENERATION PROGRAM PRODUCT AND IMAGE PROCESSING DEVICE

CROSS-REFERENCE TO RELATED APPLICATIONS

The entire disclosure of Japanese Patent Application No. 2005-351462 filed on Dec. 6, 2005 including specification, claims, drawings and summary are incorporated herein by reference in its entirety.

BACKGROUND

The present invention generally relates to technology for generating a two-dimensional image by subjecting an event set in a virtual three-dimensional space to perspective projection transformation, and in particular relates to image processing technology for representing numerous spectators in a game device or the like relating to sports.

Pursuant to the development of computer technology in recent years, image processing technology relating to TV game machines and simulators (simulation rides) is becoming universally prevalent. In this kind of system, the rich expression of images to be displayed is key in increasing the commercial value. For instance, in a TV game machine related to sports such as soccer, it is desirable to realistically express the behavior of sports players to be operated by a player as well as realistically express the behavior of the attending spectators in order to further increase the commercial value (refer to Japanese Patent Laid-Open Publication No. H11-73525).

Meanwhile, in order to colorfully present the representation of spectators as described above, it is desirable to arbitrarily change the status of spectators according to various elements such as the association with the opposing team, number of spectators, and status of the stadium. Conventionally, in order to fulfill the foregoing demand, a plurality of textures created according to various situations were prepared, and a certain texture was selected for each game and attached to a polygon in order to display the spectators. Nevertheless, the advance preparation of textures according to all assumable situations of spectators (number of spectators, ratio of type of spectators, etc.) would entail a problem of significantly increasing the burden on the designer to create such textures, and increasing the data volume to be used in generating images.

SUMMARY

Thus, an object of the present invention is to provide image processing technology capable of displaying colorful spectators without increasing the data volume required in generation images.

The present invention provides a program product for causing a computer to execute processing of mapping a texture containing a plurality of spectators to a plate-shaped polygon arranged in a plurality of areas in a virtual three-dimensional space, and generating an image containing the plurality of spectators. This program product causes the computer to function as a spectator information setting unit for setting spectator information including at least the number of spectators belonging respectively to first and second spectator types, and a color type associated respectively to the first and second spectator types, a spectator distribution unit for determining the number of spectators belonging to the first and second spectator types to be allocated respectively to the areas in the virtual three-dimensional space, a mixture ratio determination unit for determining the mixture ratio of the first and second spectator types in each of the areas in the virtual three-dimensional space, a polygon determination unit for determining a plate-shaped polygon to be arranged in the areas and mapped with a texture containing a plurality of spectators, a pallet data determination unit for determining color pallet data associated with the color of the texture based on the color type included in the spectator information so that the ratio of the spectators belonging respectively to the first and second spectator types contained in the texture achieves a state according to the mixture ratio, a mapping unit for mapping the texture defined based on the determined color pallet data to the plate-shaped polygon determined by the polygon determination unit, and an image generation unit for generating a two-dimensional image containing the plurality of spectators obtained by performing perspective projection on a perspective projection plane set in correspondence with a viewpoint of a virtual camera arranged in the virtual three-dimensional space.

According to the present invention, for instance, so as long as a texture representing a capacity crowd, it is possible to represent the increase and decrease in the number of spectators by setting the display/nondisplay of polygons, and freely change the ratio of spectators corresponding respectively to the first and second spectator types contained in the texture by using color pallet data in each texture unit. Thereby, it is possible to display colorful spectators without increasing the data volume required in generating images.

Preferably, the pallet data determination unit further determines contents of the color pallet data according to the number of spectators allocated respectively to the areas so that a part of the spectators contained in the texture will not be displayed.

Thereby, it is possible to represent the increase and decrease in the number of spectators in greater detail.

Preferably, the spectator information setting unit reconfigures the spectator information based on reconfiguration information determined according to a change of event in the virtual three-dimensional space.

Thereby, it is possible to represent the status of spectators with a highly realistic sensation.

Preferably, the polygon determination unit determines a plate-shaped polygon to be arranged in the areas and mapped with a texture containing at least a part of spectators to be displayed among a plurality of spectators.

Thereby, unnecessary polygons will not be arranged in the areas, and the data processing load can be alleviated.

Preferably, the pallet data determination unit allocates, to the texture to be mapped to the determined plate-shaped polygon, color pallet data showing a transparent color so that a portion of the spectators is not displayed when at least a part of nondisplay-target spectators is contained, and color pallet data showing the color type included in the spectator information so that the ratio of the spectators belonging respectively to the first and second spectator types will reach a state according to the mixture ratio when there are no nondisplay-target spectators.

Thereby, it is possible to easily realize the display/nondisplay of spectators in each texture.

The present invention further provides an image processing device for mapping a texture containing a plurality of spectators to a plate-shaped polygon arranged in a plurality of areas in a virtual three-dimensional space, and generating an image containing the plurality of spectators. This image processing device has a spectator information setting unit for setting spectator information including at least the number of spectators belonging respectively to first and second spectator types, and a color type associated respectively to the first and second spectator types, a spectator distribution unit for determining the number of spectators belonging to the first and second spectator types to be allocated respectively to the areas in the virtual three-dimensional space, a mixture ratio determination unit for determining the mixture ratio of the first and second spectator types in each of the areas in the virtual three-dimensional space, a polygon determination unit for determining a plate-shaped polygon to be arranged in the area and mapped with a texture containing a plurality of spectators, a pallet data determination unit for determining color pallet data associated with the color of the texture based on the color type included in the spectator information so that the ratio of the spectators belonging respectively to the first and second spectator types contained in the texture achieves a state according to the mixture ratio, a mapping unit for mapping the texture defined based on the determined color pallet data to the plate-shaped polygon determined by the polygon determination unit, and an image generation unit for generating a two-dimensional image containing the plurality of spectators obtained by performing perspective projection on a perspective projection plane set in correspondence with a viewpoint of a virtual camera arranged in the virtual three-dimensional space.

According to the present invention, for instance, so as long as a texture representing a capacity crowd, it is possible to represent the increase and decrease in the number of spectators by setting the display/nondisplay of polygons, and freely change the ratio of spectators corresponding respectively to the first and second spectator types contained in the texture by using color pallet data in each texture unit. Thereby, it is possible to display colorful spectators without increasing the data volume required in generating images.

Preferably, the pallet data determination unit further determines contents of the color pallet data according to the number of spectators allocated respectively to the areas so that a part of the spectators contained in the texture will not be displayed.

Thereby, it is possible to represent the increase and decrease in the number of spectators in greater detail.

Preferably, the spectator information setting unit reconfigures the spectator information based on reconfiguration information determined according to a change of event in the virtual three-dimensional space.

Thereby, it is possible to represent the status of spectators with a highly realistic sensation.

Preferably, the polygon determination unit determines a plate-shaped polygon to be arranged in the areas and mapped with a texture containing at least a part of spectators to be displayed among a plurality of spectators.

Thereby, unnecessary polygons will not be arranged in the areas, and the data processing load can be alleviated.

Preferably, the pallet data determination unit allocates, to the texture to be mapped to the determined plate-shaped polygon, color pallet data showing a transparent color so that a portion of the spectators is not displayed when at least a part of nondisplay-target spectators is contained, and color pallet data showing the color type included in the spectator information so that the ratio of the spectators belonging respectively to the first and second spectator types will reach a state according to the mixture ratio when there are no nondisplay-target spectators.

Thereby, it is possible to easily realize the display/nondisplay of spectators in each texture.

DETAILED DESCRIPTION

A game device is used as an example of the image generation device for explaining the embodiments of the present invention.

Figure 1:
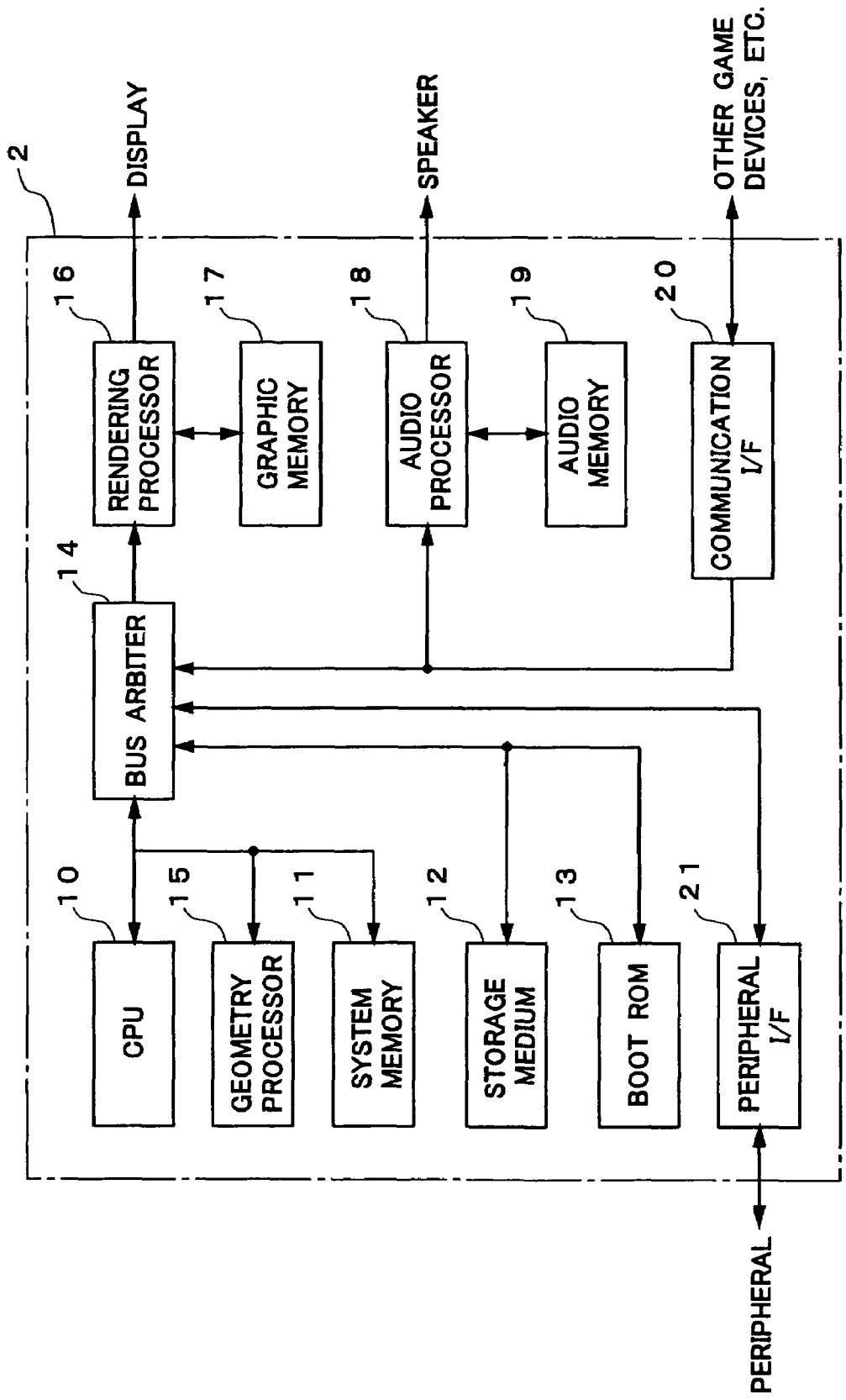
FIG. 1 is a block diagram showing the configuration of a game device according to an embodiment of the present invention.

FIG. 1 is a block diagram showing the configuration of a game device according an embodiment of the present invention. The game device 1 of this embodiment shown in FIG. 1 comprises a CPU (Central Processing Unit) 10, a system memory 11, a storage medium 12, a boot ROM 13, a bus arbiter 14, a geometry processor 15, a rendering processor 16, a graphic memory 17, an audio processor 18, an audio memory 19, a communication interface (I/F) 20, and a peripheral interface 21. In other words, the game device 1 of this embodiment has a computer configured from the foregoing CPU 10, the system memory 11 and the like, and functions as a game device related to sports (soccer for instance) by causing such computer to execute a prescribed program product. Specifically, in order to present the game, the game device 1 sequentially generates two-dimensional images viewed from a virtual camera in the virtual three-dimensional space (game space), and generates sounds such as sound effects.

The CPU (Central Processing Unit) 10 controls the overall game device 1 by executing a prescribed program.

The system memory 11 stores programs and data to be used by the CPU 10.

The storage medium 12 stores game programs and data such as images and sounds to be output. The storage medium 12 as a program data ROM may also be an IC memory such as a masked ROM or flash ROM for electronically reading data, an optical disk such as a CD-ROM or DVD-ROM for optically reading data, a magnetic disk, or the like.

The boot ROM 13 stores a program for initializing the respective blocks upon activating the game device 1.

The bus arbiter 14 controls the bus for exchanging programs and data among the respective blocks.

The geometry processor 15 calculates the positional coordinates and direction of an object, which is to be indicated on a display, in a virtual three-dimensional space (game space).

The rendering processor 16 generates (draws) images to be output to the display based on the direction and positional coordinates of the object calculated with the geometry processor 15.

The graphic memory 17 is connected to the rendering processor 16, and stores data and commands for generating images.

The audio processor 18 generates data for outputting sounds from the speaker. The sound data generated with the audio processor 18 is converted into an analog signal with a digital/analog converter not shown, thereafter input to the speaker, and then output as sound from the speaker.

The audio memory 19 is a part of the audio processor 18, and stores data and commands for generating sounds.

The communication interface (I/F) 20 performs communication processing when the game device 1 needs to perform data communication with another game device, a server device or the like.

The peripheral interface (I/F) 21 has a built-in interface for inputting and outputting data to and from the outside, and a peripheral as a peripheral device is connected thereto. Here, a peripheral includes a mouse (pointing device), a keyboard, a switch for performing key operations such as a game controller, a touch pen, as well as any other component such as a backup memory for storing the intermediate step or generated data of the program, a display device, a photographic device or the like that can be connected to the image processing device or another peripheral.

Incidentally, the system memory 11, the graphic memory 17, and the sound memory 19 may be shared for the respective functions by connecting one memory to the bus arbiter 14. Further, the respective functional blocks merely need to exist in the image processing unit 2 as functions, and the functional blocks may be connected to each other, or the respective constituent elements inside the functional blocks may be separated as another block.

Figure 2:
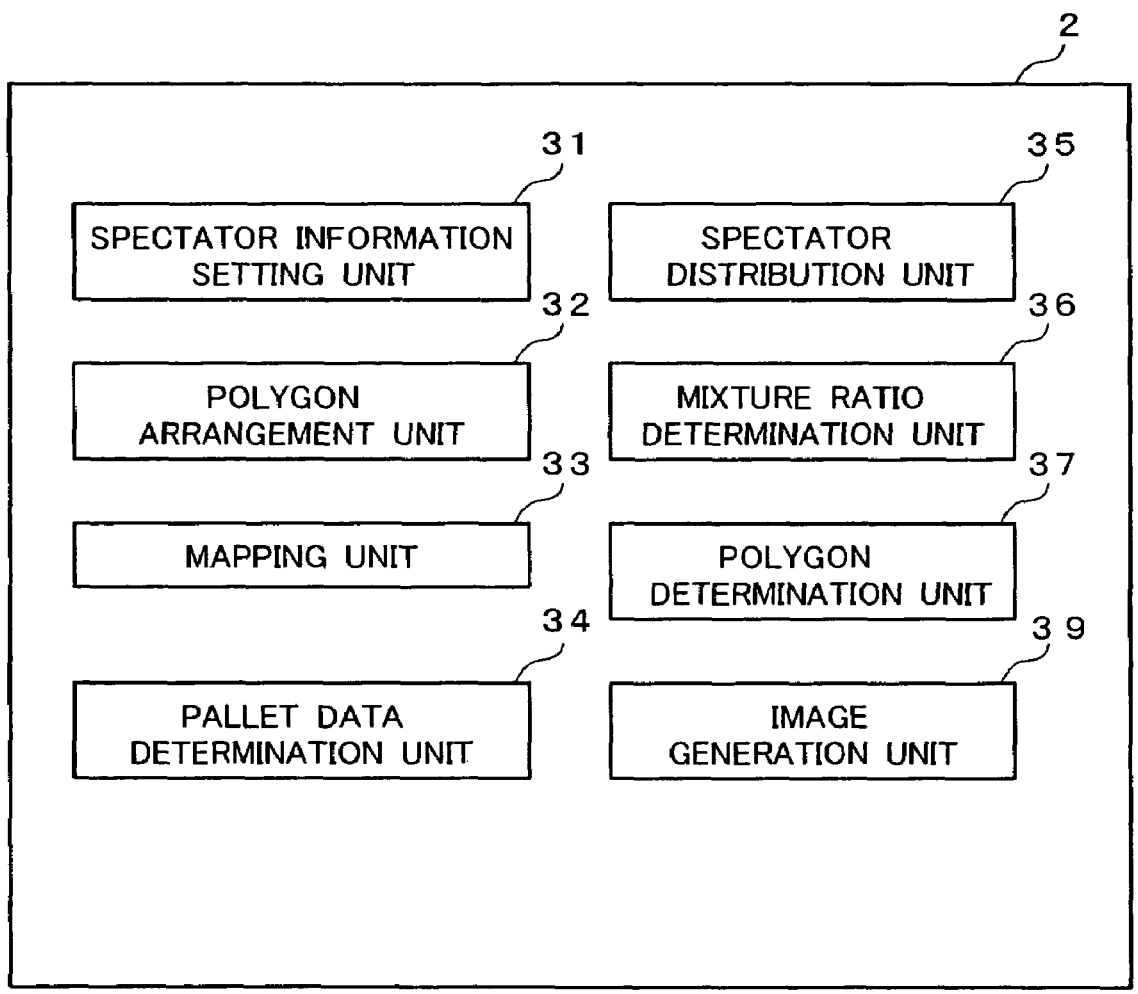
FIG. 2 is a function block diagram in a case of focusing attention on the image generation function and representing the configuration of an image processing unit according to an embodiment of the present invention.

FIG. 2 is a functional block diagram in the case of representing the configuration of the image processing unit 2 while focusing on the image generation function. As shown in FIG. 2, the image processing unit 2 comprises a spectator information setting unit 31, a polygon arrangement unit 32, a mapping unit 33, a pallet data determination unit 34, a spectator distribution unit 35, a mixture ratio determination unit 36, a polygon determination unit 37, a pallet data determination unit 34, and an image generation unit 39. Each of these units is realized by causing a computer configured from the likes of the CPU 10 and the system memory 11 shown in FIG. 1 to execute a prescribed program product.

The spectator information setting unit 31 sets stadium data (spectator information) including at least the number of spectators belonging respectively to a plurality of spectator types (home supporters, away supporters and general supporters), and a color type associated respectively to the spectator types. Incidentally, in the present embodiment, the home supporters correspond to a "first spectator type", and the away supporters correspond to a "second spectator type". Further, the "color type" includes display colors corresponding respectively to the home supporters, the away supporters, and the general supporters.

Figure 3:
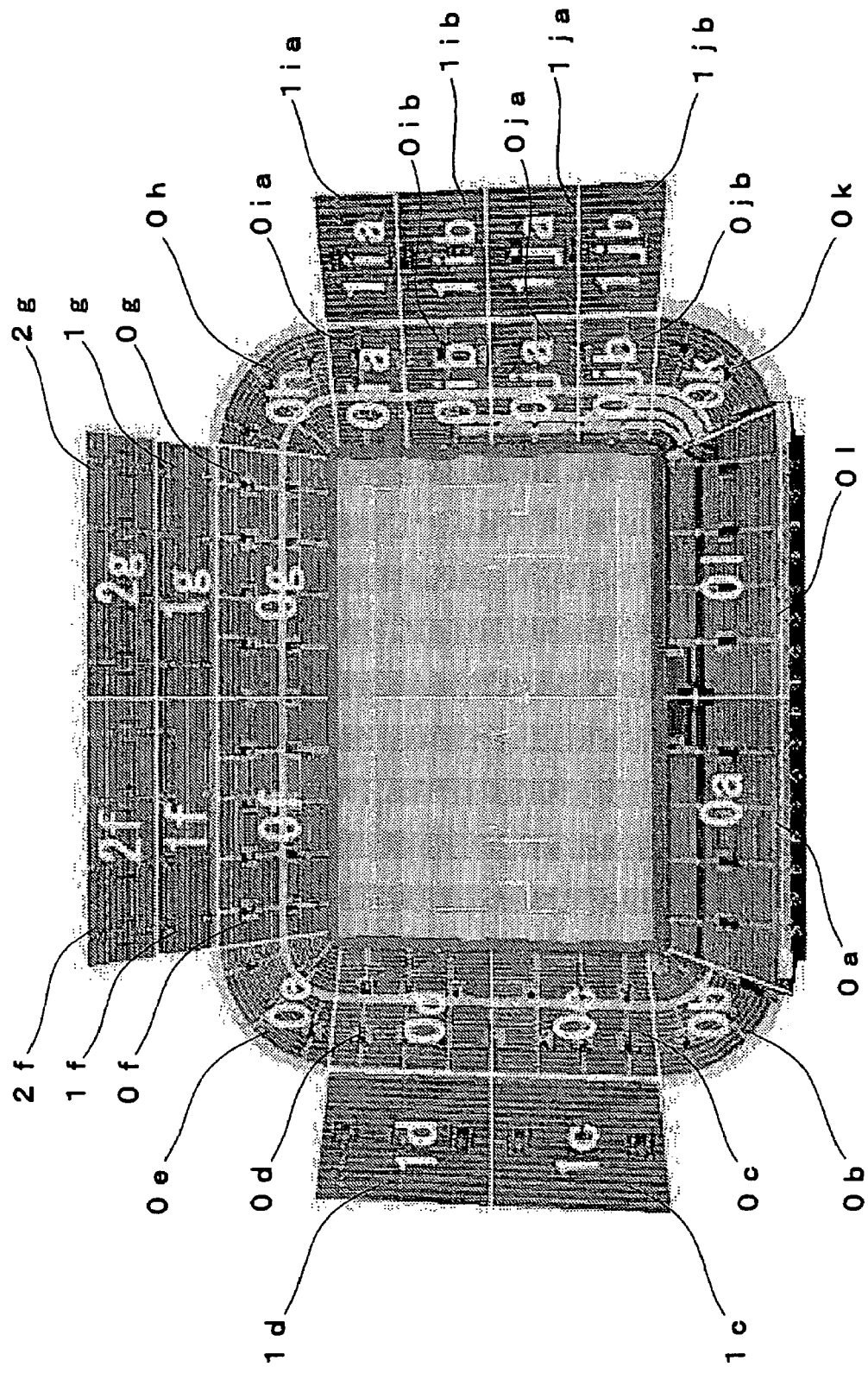
FIG. 3 is a diagram showing an example of a stadium provided in a virtual three-dimensional space.
Figure 4A:
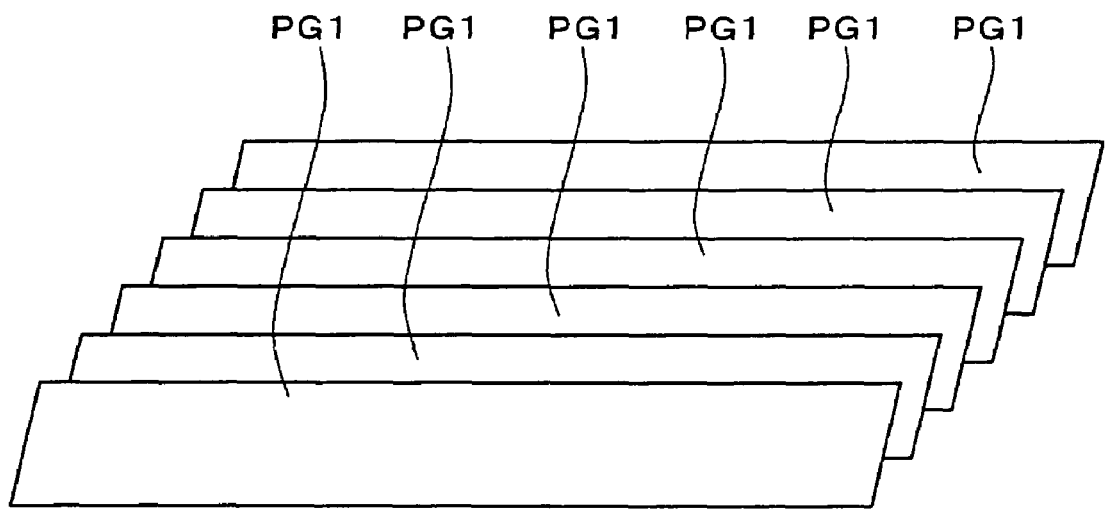
FIG. 4A and FIG. 4B are diagrams explaining the arrangement of polygons.
Figure 4B:
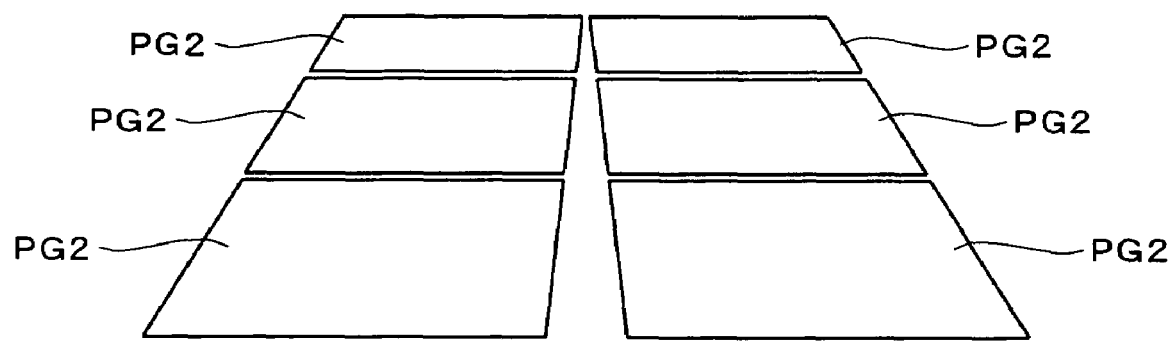

The polygon arrangement unit 32 arranges a plurality of plate-shaped polygons in each area in the virtual three-dimensional space. In the present embodiment, a stadium like the one illustrated in FIG. 3 is provided in the virtual three-dimensional space, and a prescribed number of oblong plate-shaped polygons are arranged the respective spectators' seats 0a and the like contained in the stadium. Here, the respective spectators' seats are provided circularly so as to surround the center field as illustrated in FIG. 3 and divided into the respective blocks of block a to block I, and the respective blocks are further divided into the respective floors of floor 0 to floor 2. For instance, the spectators' seats "0a" are the spectators' seats of "floor 0" of block "a". In this embodiment, the respective spectators' seats divided into blocks and floors correspond to the foregoing "areas". The polygon arrangement unit 32 according to the present embodiment, as illustrated in FIG. 4, selects the arrangement of polygons in the respective areas according to the status of such areas from the following two arrangements. Specifically, there are two types of polygon arrangements; namely, a state of aligning upright the respective plate-shaped polygons PG1 at an angle close to vertical (for instance, 70 to 80°) (FIG. 4A), and a state of laying the respective plate-shaped polygons PG2 at an angle close to horizontal (for instance, 10 to 20°) (FIG. 4B). The former polygon arrangement (FIG. 4A) is used to represent spectators in the spectators' seats such as spectators' seats 0a or 0f which are relatively close to the field. The latter polygon arrangement (FIG. 4B) is used to represent spectators in the spectators' seats such as spectators' seats 2f or 2g which are relatively far from the field. Incidentally, for the sake of convenience in the ensuing explanation, a polygon in a standing state are referred to as a "standing-board polygon", and a polygon in a lying state are referred to as a "lying-board polygon".

Figure 5:
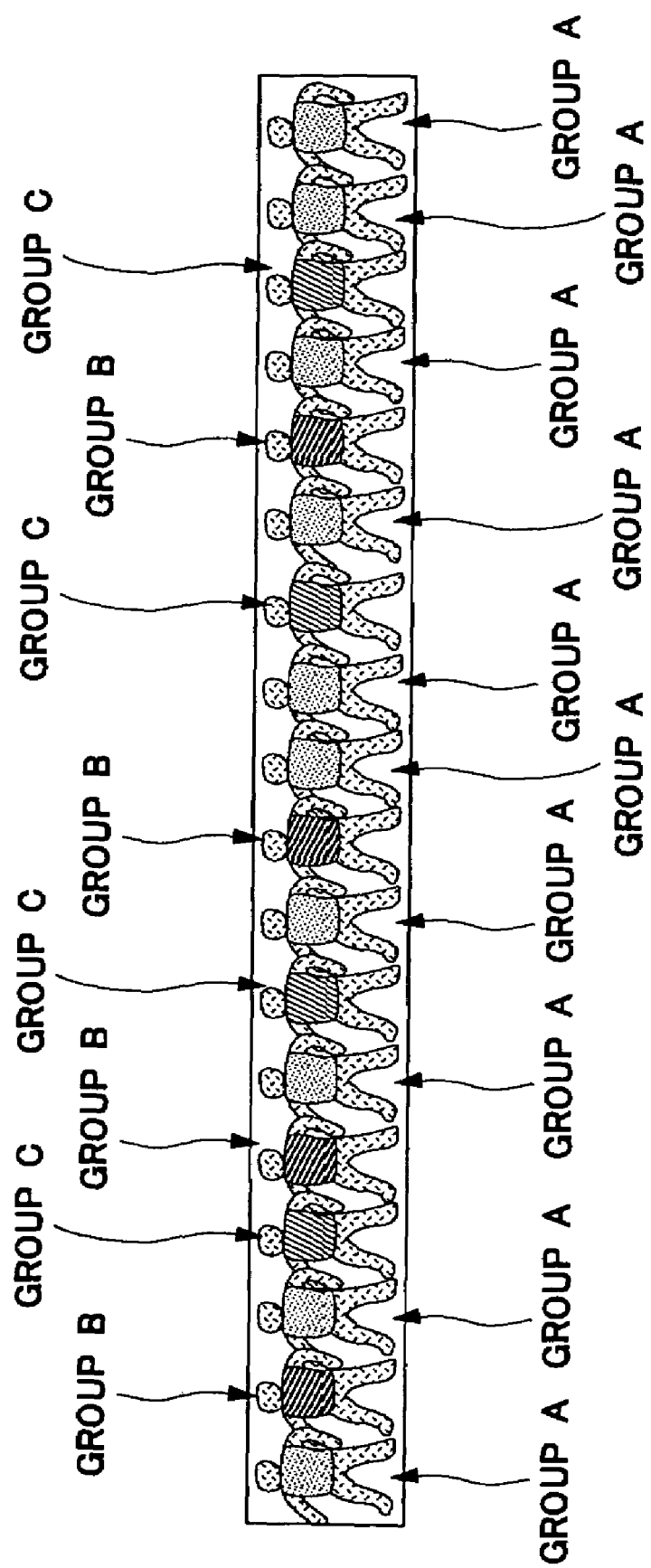
FIG. 5 is a diagram showing an example of a texture to be mapped to a standing-board polygon.
Figure 6:
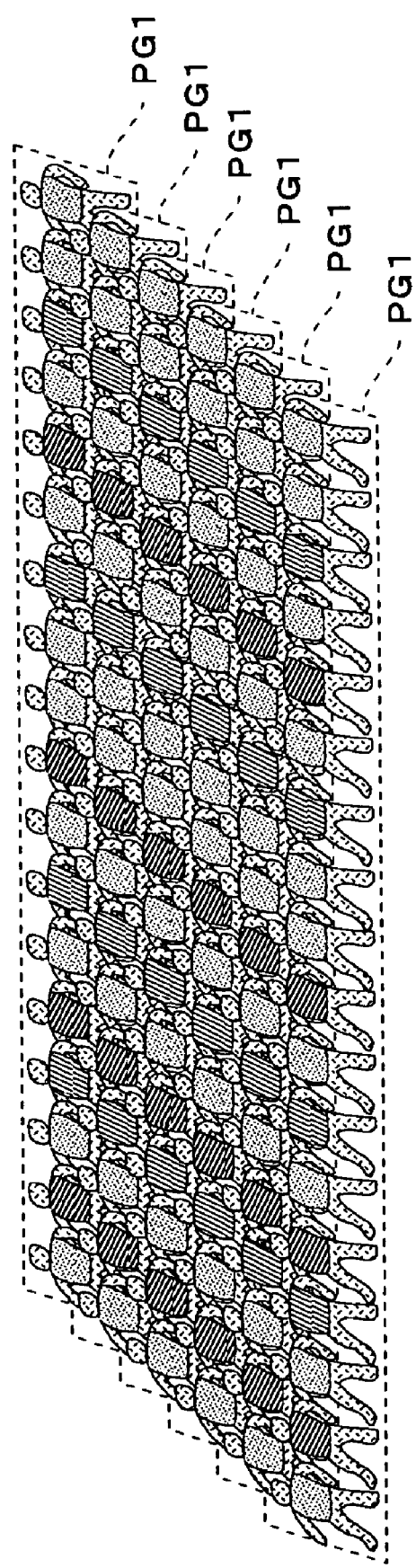
FIG. 6 is a view showing a frame format of a state where the texture shown as an example in FIG. 5 is mapped to the standing-board polygon.

The mapping unit 33 maps a texture containing a plurality of spectators to the respective polygons. Here, in this embodiment, the plurality of spectators contained in one texture are grouped. Specifically, in the case of the texture shown in FIG. 5, in order from left to right, the 1st, 3rd, 6th, 8th, 10th, 11th, 13th, 15th, 17th and 18th spectators form one group (hereinafter referred to as "spectator group A"), the 2nd, 5th, 9th and 14th spectators form one group (hereinafter referred to as "spectator group B"), and the 4th, 7th, 12th and 16th spectators form one group (hereinafter referred to as "spectator group C"), respectively. The display color (particularly the display color of portions corresponding to the upper body) of spectators belonging to the respective spectator groups A to C will be a coloration corresponding to the general supporters in default, and, although this will differ for each group, the display color can be freely changed according to the color pallet data (described in detail later). This grouping is the same regarding the texture for the lying-board polygon PG2 depicted in FIG. 7.

The pallet data determination unit 34 determines the color pallet data associated with the texture color based on information of the color type included in the stadium data so that the ratio of spectators belonging respectively to each spectator type (home supporters, away supporters and general supporters) contained in the texture achieves a state according to the mixture ratio described later. Here, color pallet data is data that is associated with the texture so as to enable the setting of the display color in various portions (pixels) of the foregoing texture (refer to FIG. 5 or FIG. 7), and the details thereof are now explained.

Figure 9:
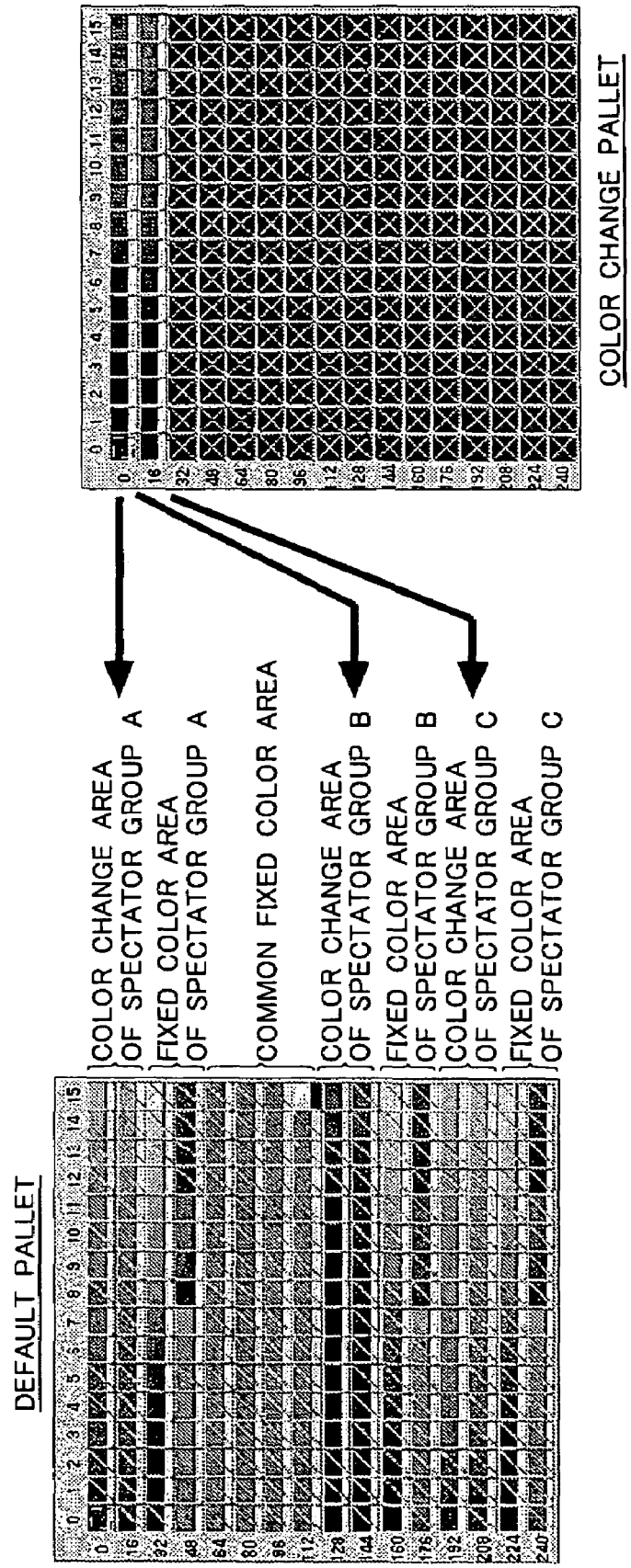
FIG. 9 is a diagram explaining color pallet data.
Figure 10:
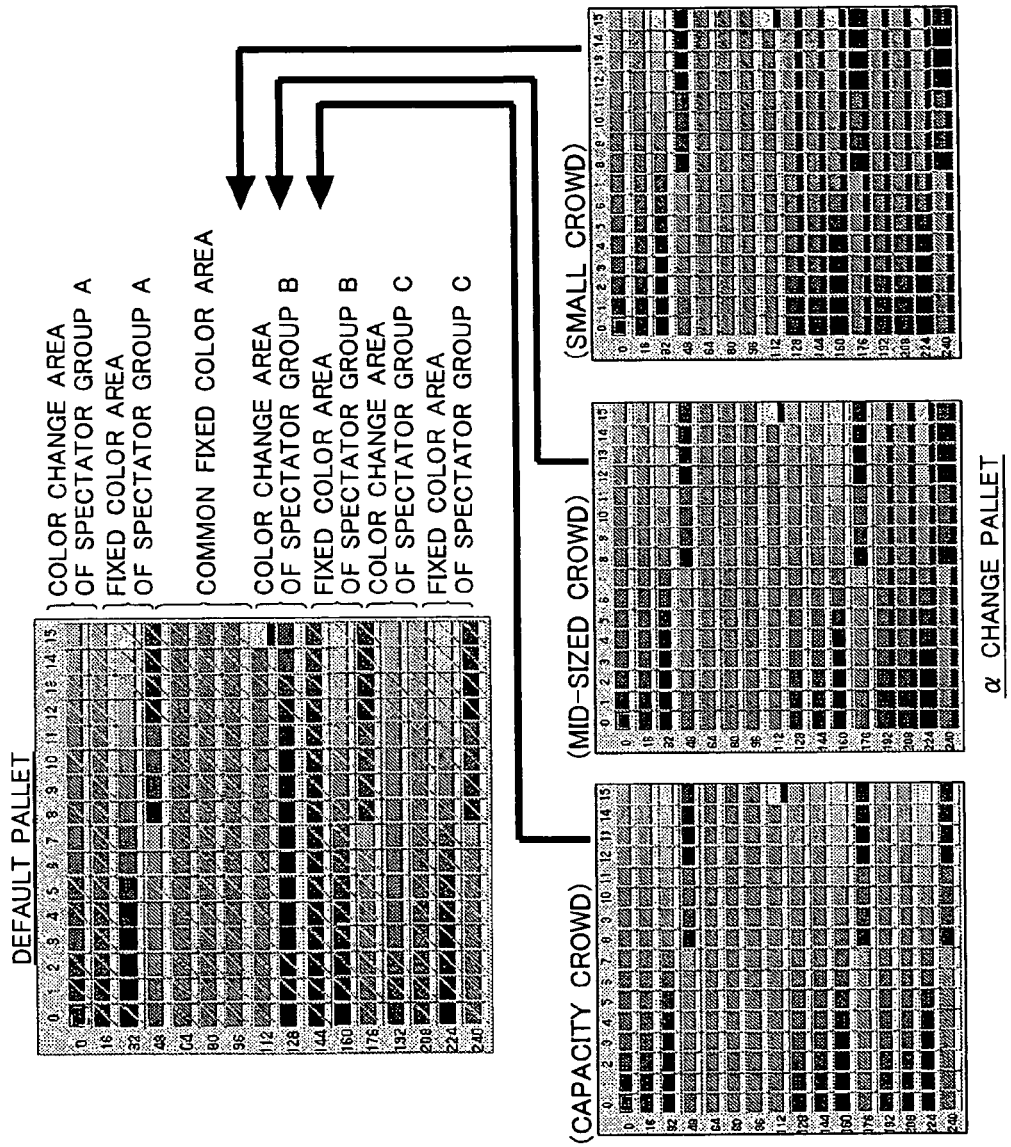
FIG. 10 is a diagram explaining color pallet data.

FIG. 9 and FIG. 10 are diagrams explaining the color pallet data. The color pallet data shown in FIG. 9 and FIG. 10 is associated with the texture shown in FIG. 5, and configured from a default pallet, a color change pallet and an α change pallet. The default pallet contains the color areas of 0 to 255, and these color areas are used to designate the display color of the respective portions of the texture shown in FIG. 5. The display color is set to represent the general supporters in default.

As the default pallet of this example, addresses 0 to 31 are defined as the color change area of spectator group A, addresses 32 to 63 are defined as the fixed color area of spectator group A, addresses 64 to 127 are defined as the common fixed color area, addresses 128 to 159 are defined as the color change area of spectator group B, addresses 160 to 191 are defined as the fixed color area of spectator group B, addresses 192 to 223 are defined as the color change area of spectator group C, and addresses 224 to 255 are defined as the fixed color area of spectator group C. Each color change area corresponds to the display color of the portion corresponding to the body of the respective spectator groups A to C, and each fixed color area corresponds to the display color of the face and arms of the respective spectator groups A to C. The common fixed color area is to be commonly used for the respective spectator groups A to C, and, for instance, corresponds to the display of portions corresponding to hats or lower bodies. Each color change area is associated with the color area of addresses 0 to 31 of the color change pallet, and the display color of portions corresponding to the bodies of the respective spectator groups A to C will change by these 32 pieces of color information being transferred to the respective color change areas of the default pallet. Incidentally, only the color information will be subject to the transfer from the color change pallet, and α information (information concerning transparency α) is not transferred.

With respect to α information, this is controlled using the α change pallet shown in FIG. 10. FIG. 10 illustrates the α change pallet corresponding respectively to capacity crowd, mid-sized crowd, and small crowd. For example, when wishing to represent a capacity crowd state, since all spectator groups A to C will be the target of display, in the capacity crowd α change pallet, "1" (full display) is set as the α value to be transferred to the color change area corresponding respectively to each of the spectator groups A to C. Further, when wishing to represent a mid-sized crowd state, since spectator groups A and B will be the target of display and spectator group C will not be the target of display, in the mid-sized crowd α change pallet, "1" (full display) is set as the α value to be transferred to the color change area corresponding respectively to each of the spectator groups A and B, and "0" (full transparency) is set as α value to be transferred to the color change area corresponding to spectator group C. Similarly, when wishing to represent a small crowd state, since spectator group A will be the target of display and spectator groups B and C will not be the target of display, in the mid-sized crowd α change pallet, "1" (full display) is set as the α value to be transferred to the color change area corresponding to spectator group A, and "0" (full transparency) is set as α value to be transferred to the color change area corresponding respectively to each of the spectator groups B and C.

Figure 7:
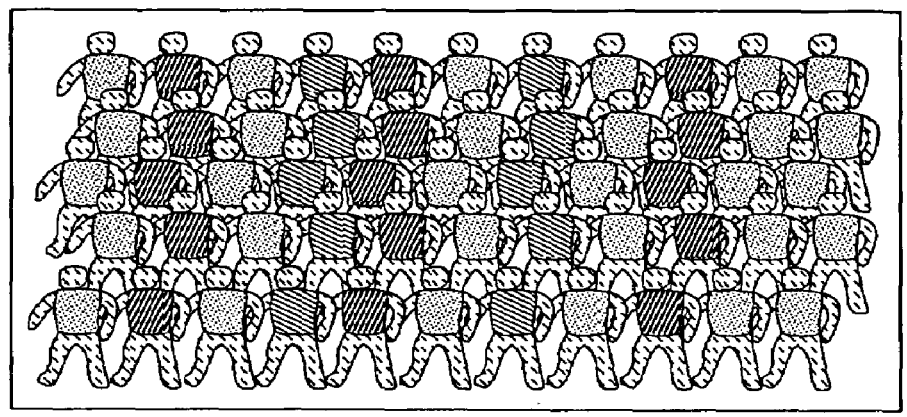
FIG. 7 is a diagram showing an example of a texture to be mapped to a lying-board polygon.
Figure 8:
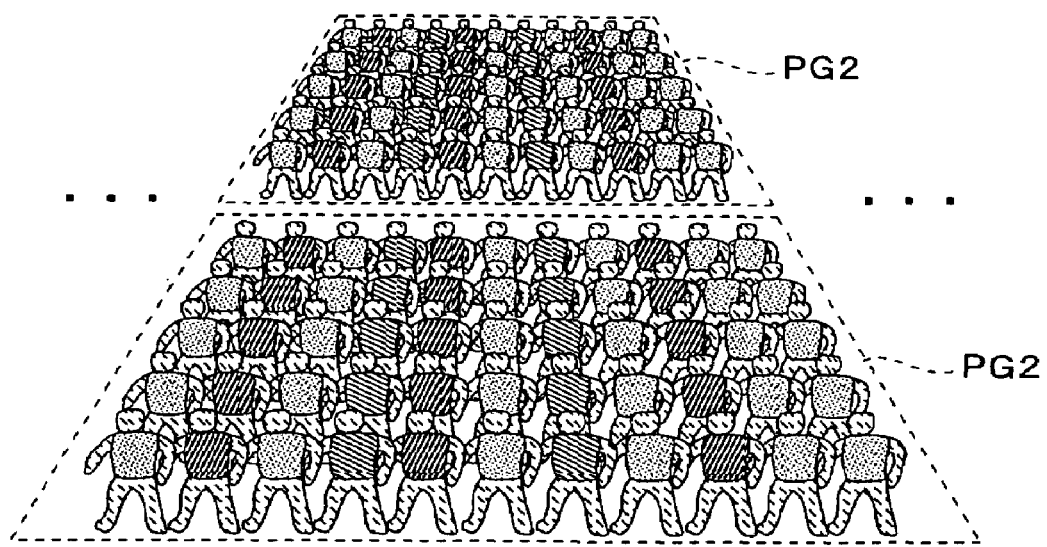
FIG. 8 is a view showing a frame format of a state where the texture shown as an example in FIG. 7 is mapped to the lying-board polygon.

Incidentally, even in the case of the texture shown in FIG. 7, the color change pallet and the α change pallet similar to the above are prepared. Since the details thereof are the same as above, the explanation thereof is omitted.

The spectator distribution unit 35 determines the number of spectators belonging respectively to the home supporters, the away supporters, and the general supporters allocated to each of the areas (refer to FIG. 3) in the virtual three-dimensional space. Here, as described above, an "area" is each of the spectators' seats divided into blocks and floors. Generally speaking, regarding the entry of spectators to the spectators' seats, accessibility of spectators of the respective attributes will be biased depending on the location of the spectators' seats. For instance, spectators' seats that have a tendency of being filled by home supporters, spectators' seats that have a tendency of being filled by away supporters, and spectators' seats that have a tendency of being generally filled by general supporters. These tendencies are set in advance to each area, and the spectator distribution unit 35 allocates spectators to the respective areas upon giving consideration to elements such as the total attendance (total value of number of spectators belonging to the respective spectator types), ratio of the number of spectators belonging to the respective spectator types, and so on. The details contents of the spectator allocation processing to be performed by the spectator distribution unit 35 will be described later.

The mixture ratio determination unit 36 determines the mixture ratio of the respective spectator types in each area in the virtual three-dimensional space. Specifically, as described above, since the home supporters, the away supporters, and the general supporters are allocated to the respective areas by the spectator distribution unit 35, the mixture ratio determination unit 36 determines the mixture ratio of the respective spectator types in each area based on this allocation status.

The polygon determination unit 37 determines the plate-shaped polygons to be arranged in the areas and mapped with the texture containing a plurality of spectators. More specifically, the polygon determination unit 37 sorts the polygons to be displayed and not to be display among the plurality of polygons arranged in the areas according to the number of spectators allocated to the respective areas. For example, if the attendance of spectators in a certain area (spectators' seats) is roughly 70%, the polygon determination unit 37 selects roughly 70% of polygons among all polygons arranged in such area as the polygons to be displayed, and selects roughly 30% of the polygons as polygons not to be displayed. As the specific contents of "nondisplay selection processing", for instance, there is processing for setting all UV values regarding the nondisplay-target polygons to 0. Or, processing for setting the α value regarding the nondisplay-target polygons to 0 may also be performed. Incidentally, when the attendance of spectators is in a capacity crowd state (100%), all polygons arranged in that area are selected as display-target polygons.

The foregoing pallet data determination unit 34 allocates, to the texture to be mapped to the plate-shaped polygon determined by the polygon determination unit 3, (1) color pallet data showing a transparent color so that a portion of the spectators is not displayed when at least a part of nondisplay-target spectators is contained, and (2) color pallet data showing the color type included in the spectator information so that the ratio of the spectators belonging respectively to the first and second spectator types will reach a state according to the mixture ratio when there are no nondisplay-target spectators. More specifically, the pallet data determination unit 34 of the present embodiment determines the contents of the α value stored in the foregoing α change pallet according to the mixture ratio.

The image generation unit 39 generates a two-dimensional image containing the plurality of spectators obtained by performing perspective projection on a perspective projection plane set in correspondence with a viewpoint of a virtual camera arranged in the virtual three-dimensional space.

Figure 11:
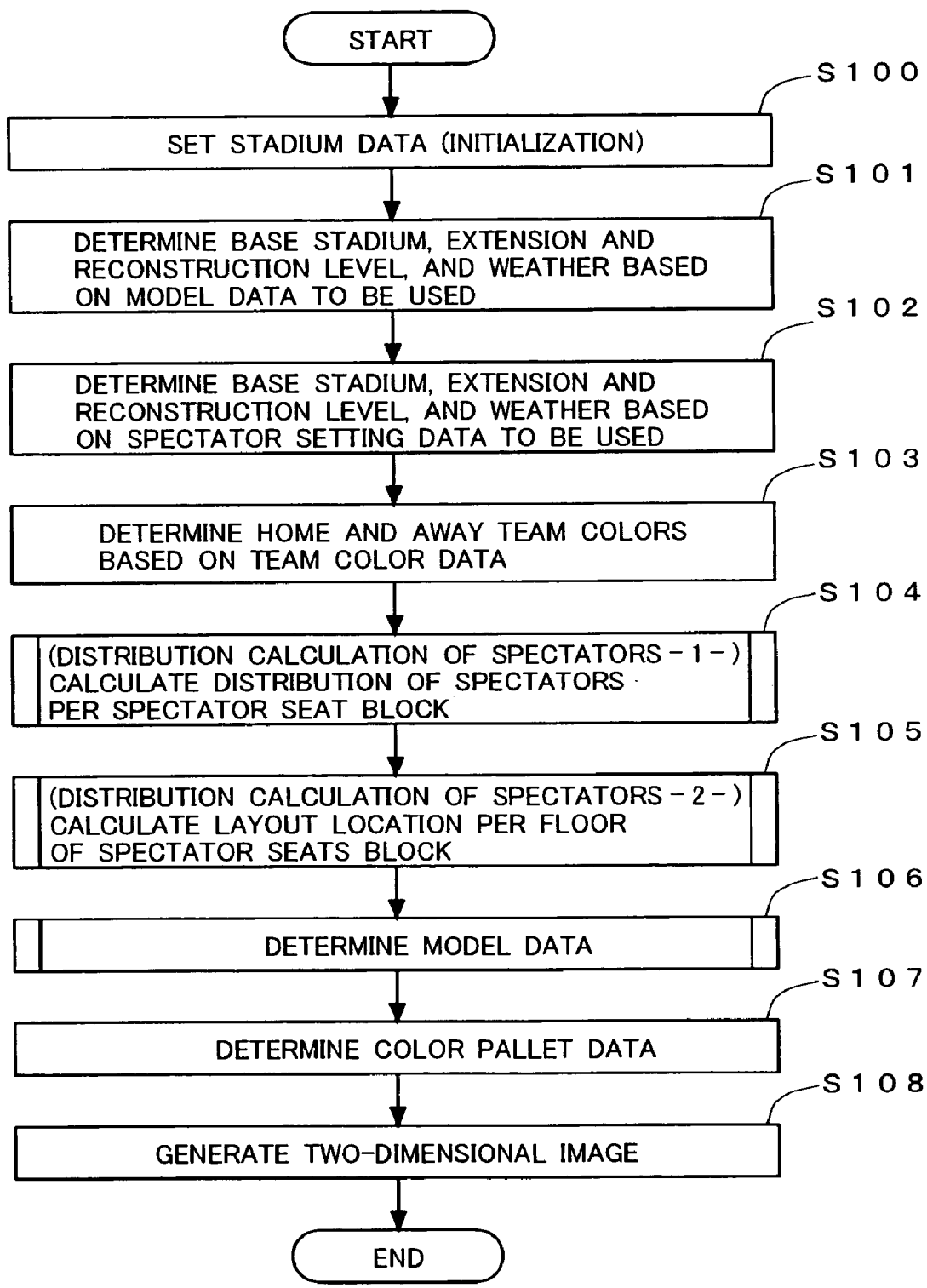
FIG. 11 is a flowchart showing the overall routine of image generation processing in the game device.

The game device of this embodiment comprises the foregoing configuration. The image generation processing routine of the game device is now explained with reference to the flowcharts. FIG. 11 is a flowchart showing the overall routine of the image generation processing in the game device.

The spectator information setting unit 31 acquires stadium data, which is the collective data required for the soccer match (FIG. 11: step S100). The stadium data includes at least the number of spectators belonging respectively to the home supporters, the away supporters, and the general supporters, and the color type (team color) associated respectively with the spectator types as described above. Further, the stadium data of this embodiment includes information such as the identification number (ID) of the base stadium, extension and reconstruction level of the stadium, weather, season, league, background level, and so on. These parameters, for instance, are set based on commands input by the player, or read from the storage medium 12. The stadium data, for example, is set as follows.

<Stadium Data>

The time of holding the soccer match can be either day or night, and day is set in this example. The weather, for instance, could be sunny, cloudy, rainy and so on, and sunny is set in this example. The season could be spring, summer, fall or winter, and winter is set in this example. The background level could be a metropolis or a small city, and metropolis is set in this example. The country (league) could be Italy, England, Netherlands and so on, and Italy is set in this example. The holding month could be any month from January to December, and December is set in this example. Contamination of the turf can be selected between "YES" or "NO", and "YES" is set in this example. The stadium number is set for the sake of convenience, and 36 is set in this example. The stadium number, for instance, is determined through a prescribed conversion table based on the country and the extension and reconstruction level.

Subsequently, the spectator information setting unit 31 determines the model data to be used based on the base stadium, the extension and reconstruction level, and the weather (FIG. 11: step S101).

The spectator information setting unit 31 thereafter determines the spectator setting data to be used based on the base stadium, the extension and reconstruction level, and the weather (FIG. 11: step S102).

Subsequently, the spectator information setting unit 31 determines the respective team colors of home and away based on the team color data (FIG. 11: step S103). For instance, when red is the team color of the home team, the color pallet data (pallet number) is set to 0, and when blue is the team color of the away team, the color pallet data is set to 4, and so on.

The spectator distribution unit 35 thereafter calculates the allocation of the number spectators to each block of the spectators' seats (FIG. 11: step S104). The detailed routine of the distribution calculation of spectators -1- is shown in FIG. 12, and explained below.

(Distribution Calculation of Spectators -1-)

Figure 12:
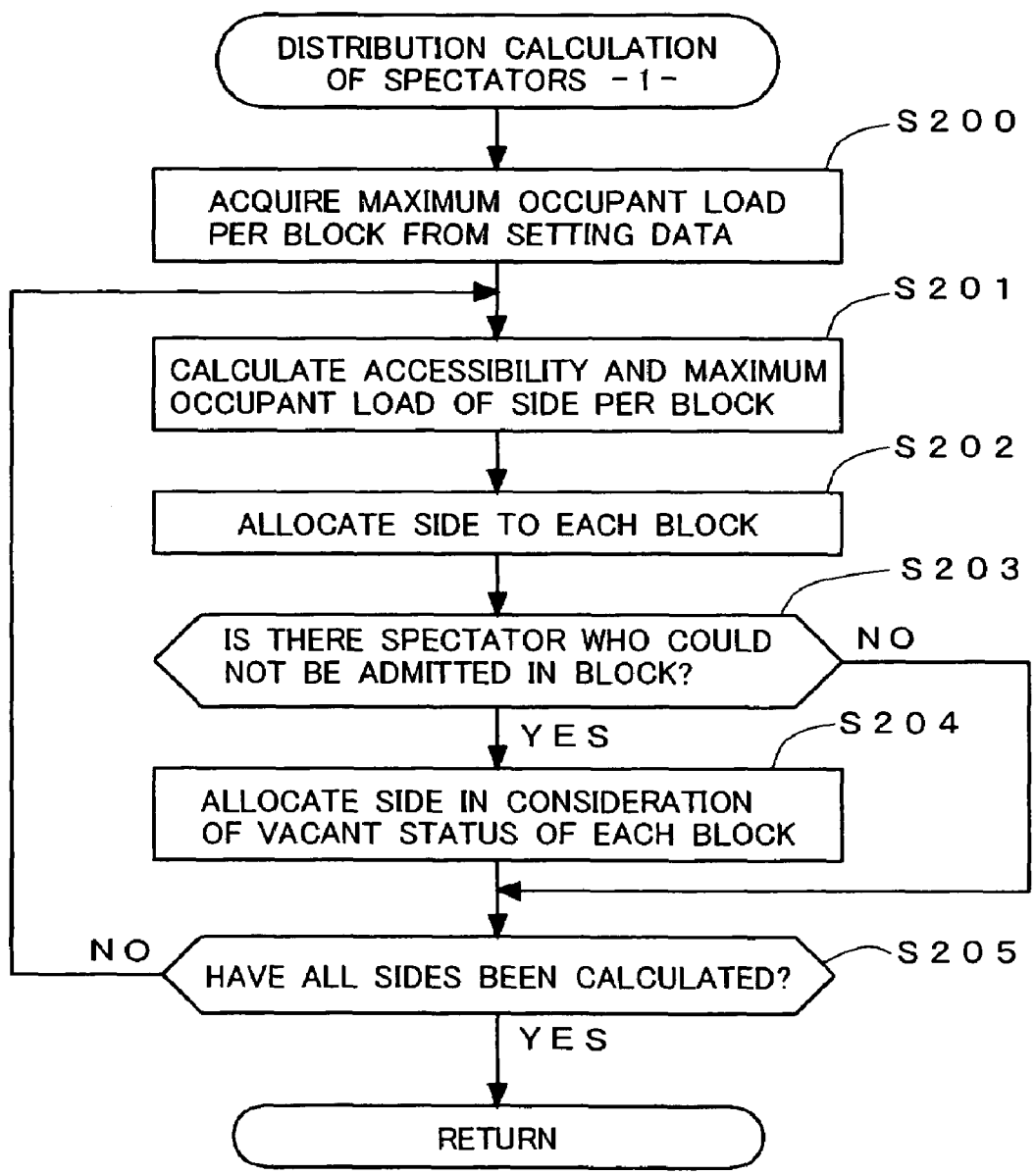
FIG. 12 is a flowchart showing a detailed routine of the distribution calculation of spectators -1-.

The spectator distribution unit 35 acquires the maximum occupant load per block based on setting data (FIG. 12: step S200). The processing contents at this step, for instance, will be as follows. For example, the occupant load of the base stadium is set at 35000 persons. Further, the maximum occupant load per block is set in the following ratios. For example, let it be assumed that the occupant ratio of block A is 22%, the occupant ratio of block B is 9%, the occupant ratio of block C is 9%, the occupant ratio of block D is 9%, the occupant ratio of block E is 12%, the occupant ratio of block F is 12%, the occupant ratio of block G is 9%, the occupant ratio of block H is 9%, and the occupant ratio of block I is 9%. Here, as the occupant ratio of each block, the maximum occupant load of block A is set to 7700 persons, the maximum occupant load of block B is set to 3150 persons, the maximum occupant load of block C is set to 3150 persons, the maximum occupant load of block D is set to 3150 persons, the maximum occupant load of block E is set to 4200 persons, the maximum occupant load of block F is set to 4200 persons, the maximum occupant load of block G is set to 3150 persons, the maximum occupant load of block H is set to 3150 persons, and the maximum occupant load of block I is set to 3150 persons, respectively.

Subsequently, the spectator distribution unit 35 calculates the accessibility and the maximum occupant load of the side per block (FIG. 12: step S201). Here, a "side" is a collective designation of the home supporters, the away supporters, and the general supporters. The processing contents at this step, for instance, will be as follows.

(a) The accessibility (basic value) of the side per block will be as listed below. For example, accessibility of the side to block A is 50% for home supporters, 0% for away supporters, and 0% for general supporters.

|  | A | B | C | D | E | F | G | H | I |
|---|---|---|---|---|---|---|---|---|---|
| Home Supporters | 50% | 20% | 5% | 0% | 0% | 0% | 0% | 5% | 20% |
| Away Supporters | 0% | 0% | 0% | 10% | 50% | 30% | 10% | 0% | 0% |
| General Supporters | 0% | 10% | 30% | 10% | 0% | 0% | 10% | 30% | 10% |

(b) The accessibility (correction value) of the side per block will be as listed below.

|  | A | B | C | D | E | F | G | H | I |
|---|---|---|---|---|---|---|---|---|---|
| Common to Sides | 20% | 10% | 10% | 10% | 10% | 10% | 10% | 10% | 10% |

(c) By using the foregoing basic value and correction value, "basic value+occupant ratio of each block−correction value" can be calculated, and the accessibility of the side to each block is calculated thereby. The calculation results are listed below. For instance, in block A, the home supporters have 52% accessibility, the away supporters have 0% accessibility, and the general supporters have 2% accessibility.

|                   | A   | B   | C   | D  | E   | F   | G  | H   | I   |
|-------------------|-----|-----|-----|----|-----|-----|----|-----|-----|
| Home Supporters   | 52% | 19% | 4%  | 0% | 0%  | 2%  | 0% | 4%  | 19% |
| Away Supporters   | 0%  | 0%  | 0%  | 9% | 52% | 32% | 9% | 0%  | 0%  |
| General Supporters| 2%  | 9%  | 29% | 9% | 2%  | 2%  | 9% | 29% | 9%  |

Subsequently, the spectator distribution unit 35 allocates the side to the respective blocks (FIG. 12: step S202). The processing contents at this step, for instance, will be as follows.

(a) Number of Spectators

Let it be assumed that the number of spectators is, for instance, 15000 home supporters, 8000 away supporters, and 7000 general supporters.

(b) Allocation to Respective Blocks

Accessibility of the side per block, for instance, will be the ratios listed below. For example, accessibility of the side to block A will be 52% for home supporters, 0% for away supporters, and 2% for general supporters.

|                   | Block |     |     |    |     |     |    |     |     |
|-------------------|-----|-----|-----|----|-----|-----|----|-----|-----|
|                   | A   | B   | C   | D  | E   | F   | G  | H   | I   |
| Home Supporters   | 52% | 19% | 4%  | 0% | 0%  | 2%  | 0% | 4%  | 19% |
| Away Supporters   | 0%  | 0%  | 0%  | 9% | 52% | 32% | 9% | 0%  | 0%  |
| General Supporters| 2%  | 9%  | 29% | 9% | 2%  | 2%  | 9% | 29% | 9%  |

(c) Calculation Formula

The number of persons in the side to be allocated per block is calculated based on the calculation formula of "number of persons in side×accessibility to such block÷sum of accessibility to such block". The calculation results are listed below. For example, in block A, 7800 persons are allocated as home supporters, 0 persons are allocated as away supporters, and 140 persons are allocated as general supporters.

|                   | Block |      |      |     |      |      |     |      |      |
|-------------------|------|------|------|-----|------|------|-----|------|------|
|                   | A    | B    | C    | D   | E    | F    | G   | H    | I    |
| Home Supporters   | 7800 | 2850 | 600  | 0   | 0    | 300  | 0   | 600  | 2850 |
| Away Supporters   | 0    | 0    | 0    | 706 | 4078 | 2510 | 706 | 0    | 0    |
| General Supporters| 140  | 630  | 2030 | 630 | 140  | 140  | 630 | 2030 | 630  |

Subsequently, the spectator distribution unit 35 determines whether there was any spectator who could not enter a block (FIG. 12: step S203). A positive determination (YES) is obtained when there was a spectator who could not enter a block, and the spectator distribution unit 35 allocates the side in consideration of the vacancy status of the respective blocks (FIG. 12: step S204). Further, a negative determination (NO) is obtained when there was no spectator who could not enter a block, and the spectator distribution unit 35 proceeds to the processing of subsequent step S205 without performing the processing at step S204. The processing contents at this step, for instance, will be as follows.

(a) Occupant Load Per Block

As the occupant load of each block, the maximum occupant load of block A is set to 7700 persons, the maximum occupant load of block B is set to 3150 persons, the maximum occupant load of block C is set to 3150 persons, the maximum occupant load of block D is set to 3150 persons, the maximum occupant load of block E is set to 4200 persons, the maximum occupant load of block F is set to 4200 persons, the maximum occupant load of block G is set to 3150 persons, the maximum occupant load of block H is set to 3150 persons, and the maximum occupant load of block I is set to 3150 persons, respectively.

(b) Accessibility of Side to Each Block

Accessibility of the side to each block can be sought with the foregoing calculation formula as listed below.

|                   | Block |     |     |    |     |     |    |     |     |
|-------------------|-----|-----|-----|----|-----|-----|----|-----|-----|
|                   | A   | B   | C   | D  | E   | F   | G  | H   | I   |
| Home Supporters   | 52% | 19% | 4%  | 0% | 0%  | 2%  | 0% | 4%  | 19% |
| Away Supporters   | 0%  | 0%  | 0%  | 9% | 52% | 32% | 9% | 0%  | 0%  |
| General Supporters| 2%  | 9%  | 29% | 9% | 2%  | 2%  | 9% | 29% | 9%  |

(c) Allocation

Allocation can be sought with the foregoing calculation formula as listed below (unit: persons).

|                   | Block |      |      |     |      |      |     |      |      |
|-------------------|------|------|------|-----|------|------|-----|------|------|
|                   | A    | B    | C    | D   | E    | F    | G   | H    | I    |
| Home Supporters   | 7800 | 2850 | 600  | 0   | 0    | 300  | 0   | 600  | 2850 |
| Away Supporters   | 0    | 0    | 0    | 706 | 4078 | 2510 | 706 | 0    | 0    |
| General Supporters| 140  | 630  | 2030 | 630 | 140  | 140  | 630 | 2030 | 630  |

(d) Detailed Example of Processing

The home supporters, the away supporters, and the general supporters are determined in that order. For example, regarding the home supporters, if 100 persons were not able to enter block A, foremost, a vacant block is searched in order from a block with the highest accessibility. In this example, since block C is vacant, the allocation of block C is increased by 100 persons. Regarding the general supporters, for example, if such general supporters cannot enter block A since it is filled with home supporters, a vacant block is searched in order from a block with the highest accessibility. In this example, since block C is vacant, the allocation of block C is increased by 140 persons.

Subsequently, the spectator distribution unit 35 determines whether all sides have been calculated (FIG. 12: step S205). A negative determination (NO) is obtained when all sides have not been calculated, and the spectator distribution unit 35 performs foregoing step S201 onward once again. Moreover, a positive determination (YES) is obtained when all sides have been calculated, and the spectator distribution unit 35 ends the processing of this routine.

The spectator distribution unit 35 thereafter calculates the layout location of spectators per floor of the spectators' seats block (FIG. 11: step S105). The detailed routine of this distribution calculation of spectators -2- is shown in FIG. 13, and described below.

(Distribution Calculation of Spectators -2-)

Figure 13:
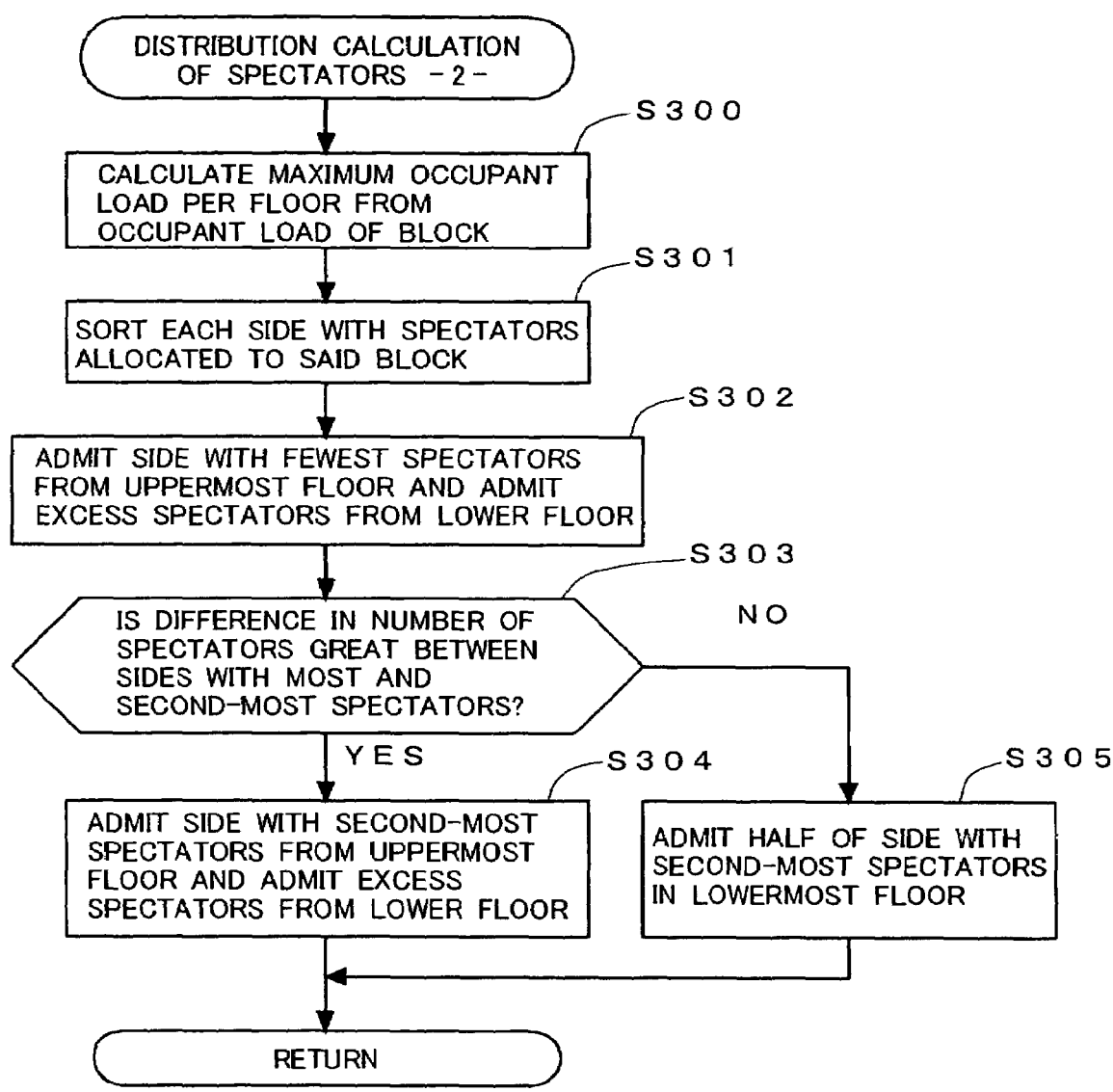
FIG. 13 is a flowchart showing a detailed routine of the distribution calculation of spectators -2-.

The spectator distribution unit 35 calculates the maximum occupant load per floor based on the occupant load of the block (FIG. 13: step S300). The processing contents at this step, for instance, will be as follows. For example, the following is an exemplification of the calculation regarding block F.

(a) Items of Spectator Setting Data (Floor Data)

For example, the maximum occupant load of floor 1F is 3000 persons, and the accessibility is 70%. The maximum occupant load of floor 2F is 1200 persons, and the accessibility is 30%.

(b) Number of Spectators

For example, there are 300 home supporters, 2500 away supporters, and 200 general supporters, and the total number is 3000 persons.

(c) Allocation Per Floor

The allocation per floor of block F under the foregoing conditions will be 2100 persons on floor 1F and 900 persons on floor 2F.

Subsequently, the spectator distribution unit 35 sorts the respective sides based on the number of persons allocated to the block (FIG. 13: step S301). The processing contents at this step, for instance, will be as follows. For example, the default sequence of the respective sides will be 1: home supporters, 2: away supporters, and 3: general supporters. Further, the number of persons in the respective sides allocated to the block (for instance, block F) will be 300 home supporters, 2500 away supporters, and 200 general supporters. Thus, the sequence of the respective sides after sorting will be 1: away supporters, 2: home supporters, and 3: general supporters.

The spectator distribution unit 35 thereafter admits the side with the fewest spectators from the uppermost floor, and admits the excess people to the lower floor (FIG. 13: step S302). The processing contents at this step, for instance, will be as follows. For example, the number of people of the side with the fewest spectators allocated to the block will be 600 home supporters. Further, the maximum occupant load of the respective floors of the block will be 2000 persons in floor 1F, 1000 persons in floor 2F, and 500 persons in floor 3F. The distribution of home supporters will be 0 persons to floor 1F, 100 persons to floor 2F, and 500 persons to floor 3F.

Subsequently, the spectator distribution unit 35 determines whether the difference in the number of persons in the sides with the most and second-most persons is great (FIG. 13: step S303). A positive determination (YES) is obtained if the difference in the number of persons is great, and the spectator distribution unit 35 admits the side with the second-most persons from the uppermost floor, and admits the excess people to the lower floor (FIG. 13: step S304). Further, a negative determination (NO) is obtained if the difference in the number of persons is not great, and the spectator distribution unit 35 admits the half of the side with the second-most persons to the lowermost floor (FIG. 13: step S305). The processing of this routine is thereby ended. The processing contents at this step, for instance, will be as follows. Determination of the difference in the number of persons is sought, for example, based on the value of "second-most number of persons÷most number of persons". In this example, the difference in the number of persons is determined to be great when the calculated value is less than 0.3 (positive determination), and the difference in the number of persons is determined to be small when the calculated value 0.3 or higher (negative determination). For instance, let it be assumed that the maximum occupant load of each floor of the block is 1500 persons for floor 1F, 1000 persons for floor 2F, and 500 persons for floor 3F. Further, let it be assumed that the number of persons in the side allocated to the block was 1500 home supporters, 800 away supporters, and 200 general supporters 200. In this case, 800÷1500=0.53, and the number of persons is determined to be small (negative determination). Here, 1100 home supporters, 400 away supporters and 0 general supporters are allocated to floor 1F, 400 home supporters, 0 away supporters and 200 general supporters are allocated to floor 2F, and 0 home supporters, 400 away supporters and 0 general supporters are allocated to floor 3F, respectively. Further, let it be assumed that the number of persons in the side allocated to the block is 1500 home supporters, 300 away supporters, and 200 general supporters. In this case, 300÷1500=0.2, and the number of persons is determined to be great (positive determination). Here, 1500 home supporters, 0 away supporters and 0 general supporters are allocated to floor 1F, 0 home supporters, 300 away supporters and 200 general supporters are allocated to floor 2F, and 0 home supporters, 500 away supporters and 0 general supporters are allocated to floor 3F, respectively.

Subsequently, processing for determining the model data of spectators is performed (FIG. 11: step S106). The specific processing contents at this step are as follows. Foremost, the total number of spectators of each area (block or floor) is determined. Next, the total number of home supporters, away supporters, and general supporters, respectively, in each area is determined. Then, the mixture level (total number of spectators in the area÷area capacity) is determined using the total number of spectators in the area determined above. Thereafter, based on the determined mixture level (existence ratio data of spectators), a plurality of plate-shaped polygons to be arranged in the area and displayed, or a plurality of plate-shaped polygons not to be displayed are selected, and the model data of the "display-target plate-shaped polygons" to be arranged in the area is determined. Incidentally, the apex data of the model of the determined "display-target plate-shaped polygons" will be subject to apex processing (for use in rendering). The processing at this step primarily involves the mixture ratio determination unit 36, the polygon determination unit 37 and the pallet data determination unit 34. The detailed routine for determining the model data is shown in FIG. 14, and explained below.

(Determination of Model Data)

Figure 14:
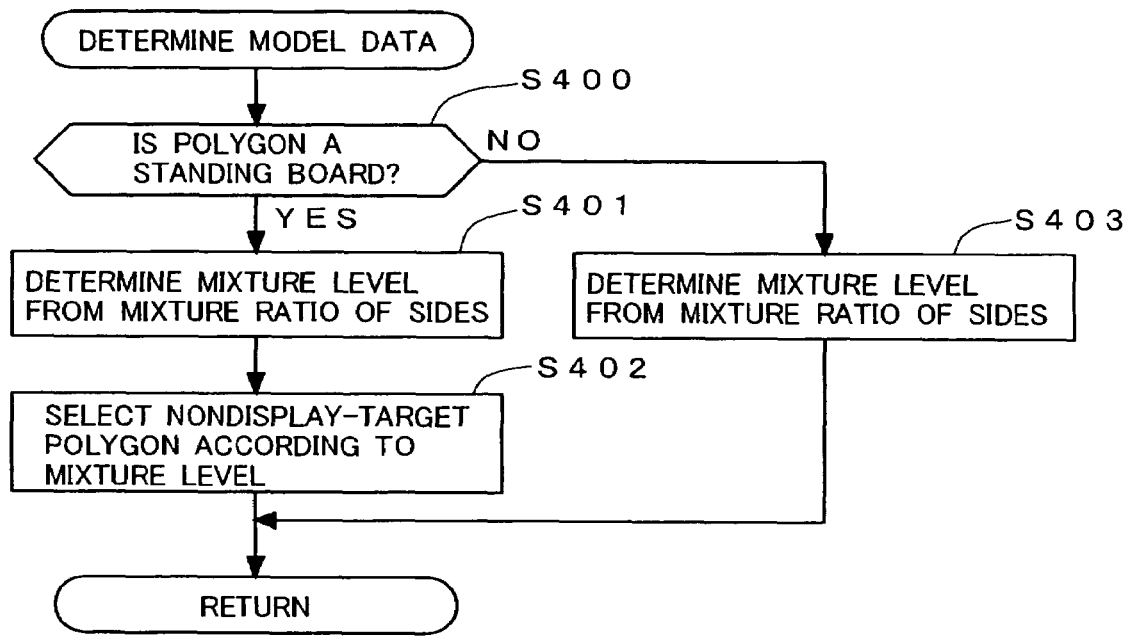
FIG. 14 is a flowchart showing a detailed routine for rewriting model data.

The mixture ratio determination unit 36 determines, for each area, whether the polygon to be arranged in such area is a standing-board polygon (FIG. 14: step S400). A positive determination (YES) is obtained if the arranged polygon is a standing-board polygon, and the mixture ratio determination unit 36 determines the mixture level based on the mixture ratio of the sides (FIG. 14: step S401). The processing contents at this step, for instance, will be as follows. For example, in this example, the arranged polygons will be standing-board polygons on floor 1F and floor 2F, and lying-board polygons on floor 3F. The mixture level is sought by calculating the "occupant load of a floor maximum occupant load of that floor". Specifically, the mixture level will be level 0 when it is 0.00 or more and less than 0.05, level 1 when it is 0.05 or more and less than 0.20, level 2 when it is 0.20 or more and less than 0.30, level 3 when it is 0.30 or more and less than 0.40, level 4 when it is 0.40 or more and less than 0.50, level 5 when it is 0.50 or more and less than 0.60, level 6 when it is 0.60 or more and less than 0.70, level 7 when it is 0.70 or more and less than 0.80, level 8 when it is 0.80 or more and less than 0.90, level 10 when it is 0.90 or more and less than 0.99. As an example, when calculating the mixture level of floor 2F of block A, since the occupant load and the maximum occupant load of block A are 1000 persons and 1500 persons, respectively, the mixture level in this case will be level 6 (1000÷1500=0.66).

Subsequently, the polygon determination unit 37 selects a polygon not to be displayed according to the mixture level (mixture ratio) determined by the mixture ratio determination unit 36 (FIG. 14: step S402). In this step, the number of nondisplay polygons is randomly selected according to the mixture level. Incidentally, certain rules may be set in the selection method of nondisplay polygons. Thereby, it is possible to realize the increase and decrease of the general number of spectators. The processing contents at this step, for instance, will be as follows. The existence ratio of spectators per mixture level will be as listed below. For example, since floor 2F of block A has a mixture level of 6, 30% of the polygons in the front row, 60% of the polygons in the middle row, and 60% of the polygons in the back row are not displayed.

| <List of Spectators Existence Ratio> | | | |
|---|---|---|---|
| Mixture Level | Front Row | Middle Row | Back Row |
| 1 | 20% | 0% | 0% |
| 2 | 40% | 0% | 0% |
| 3 | 50% | 0% | 0% |
| 4 | 50% | 30% | 10% |
| 5 | 60% | 30% | 20% |
| 6 | 70% | 40% | 40% |
| 7 | 70% | 70% | 50% |
| 8 | 80% | 80% | 80% |
| 9 | 100% | 90% | 80% |
| 10 | 100% | 100% | 100% |

Further, when a negative determination (NO) is obtained at foregoing step S400; in other words, even when the arranged polygon is a lying-board polygon, the mixture ratio determination unit 36 determines the mixture level based on the mixture ratio of the sides (FIG. 14: step S403). The mixture level is sought by calculating the "occupant load of a floor÷maximum occupant load of such floor". The processing contents at this step, for instance, will be as follows. For example, regarding floor 3F of block A, when the occupant load is 500 persons and the maximum occupant load is 1000 persons, the mixture level in this case will be level 5.

Subsequently, the pallet data determination unit 34 determines the contents of the color pallet data according to the mixture level (mixture ratio) determined with the mixture ratio determination unit 36 (FIG. 11: step S107). Specifically, contents of the α value stored in the α change pallets prepared for the standing-board polygons are changed. For instance, α change pallets set with several patterns of the α value according to the number of spectators are prepared, and the pallet data determination unit 34 selects the α change pallet of a pattern suitable for the mixture level among the foregoing α change pallets. Thereby, the α value of the default pallet is rewritten, and, in cases other than the capacity crowd, for instance, portions corresponding to the spectator group C of that texture become transparent, and the increase and decrease in the number of spectators are represented in greater detail. Further, a state where the spectators are more dispersed can also be represented in texture units. Moreover, specifically, contents of the α value stored in the α change pallets prepared for the lying-board polygons are changed. The details thereof are the same as above.

Subsequently, the image generation unit 39 generates a two-dimensional image obtained by obtained by performing perspective projection on a perspective projection plane set in correspondence with a viewpoint of a virtual camera arranged in the virtual three-dimensional space containing the respective polygons mapped with a texture updated with the display color and the like (FIG. 11: step S108). Specifically, the "display-target plate-shaped polygons" are arranged in a world coordinate system. Then, perspective transformation is performed to the viewpoint coordinate system. An address of the texture, in which the color is determined by referring to the color pallet to match the coordinates of the respective polygons, is designated and mapped to create a two-dimensional image (rendering processing). Here, the texture to be used in the respective areas is a common texture. Then, the color of the texture is determined according to the color defined based on the color pallet data defined for each area, and the texture represented with such color is mapped to the display-target plate-shaped polygon.

FIG. 15 to FIG. 19 are diagrams showing examples of a two-dimensional image generated with the image generation unit. These diagrams show the state of viewing the spectators' seats from the front side.

Figure 15:
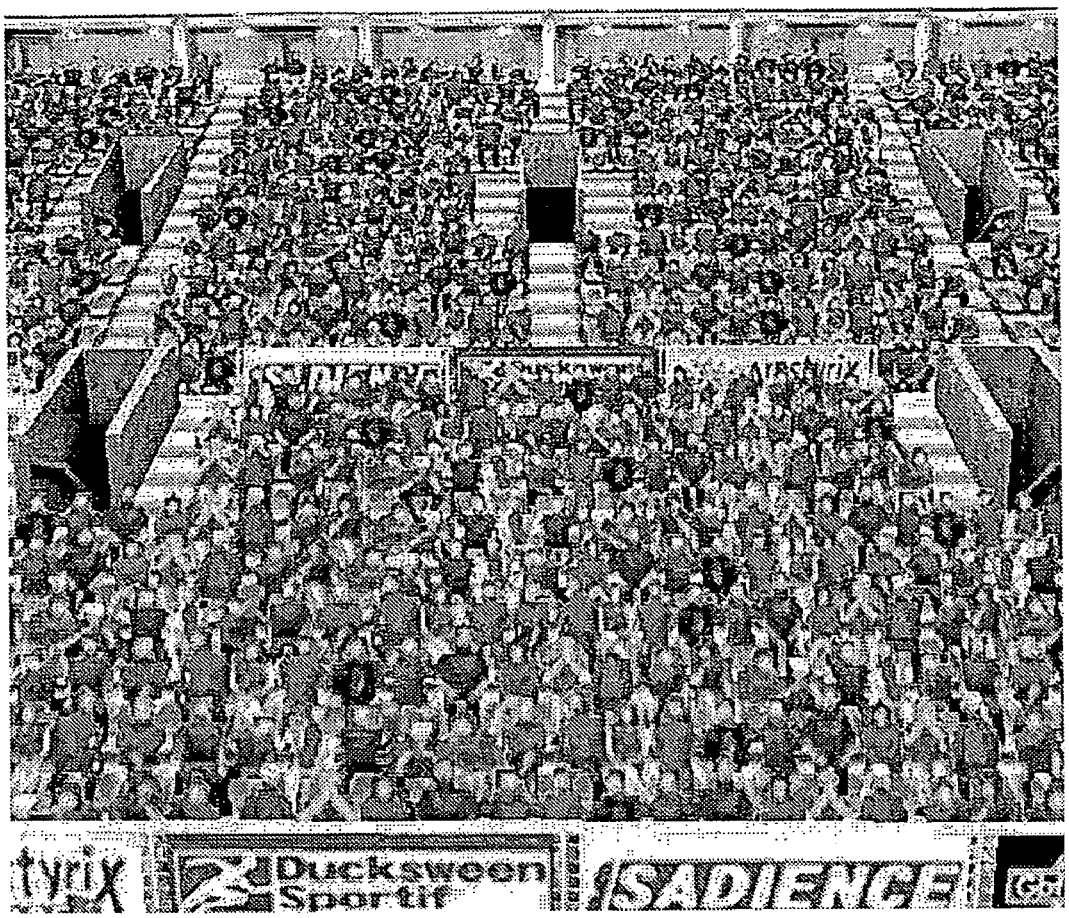
FIG. 15 is a diagram showing an example of a two-dimensional image generated with the image generation unit.

FIG. 15 is a two-dimensional image showing the spectators' seats of a capacity crowd. In these spectators' seats, all polygons (standing-board polygons or lying-board polygon) are the target of display, and "1" is set as the α value of the color pallet data; that is, set to be a transparent state. Further, the same display color (for instance, red) is set to all spectator groups A to C, and represents a state where most of the spectators' seats are filled by the home supporters (or away supporters).

Figure 16:
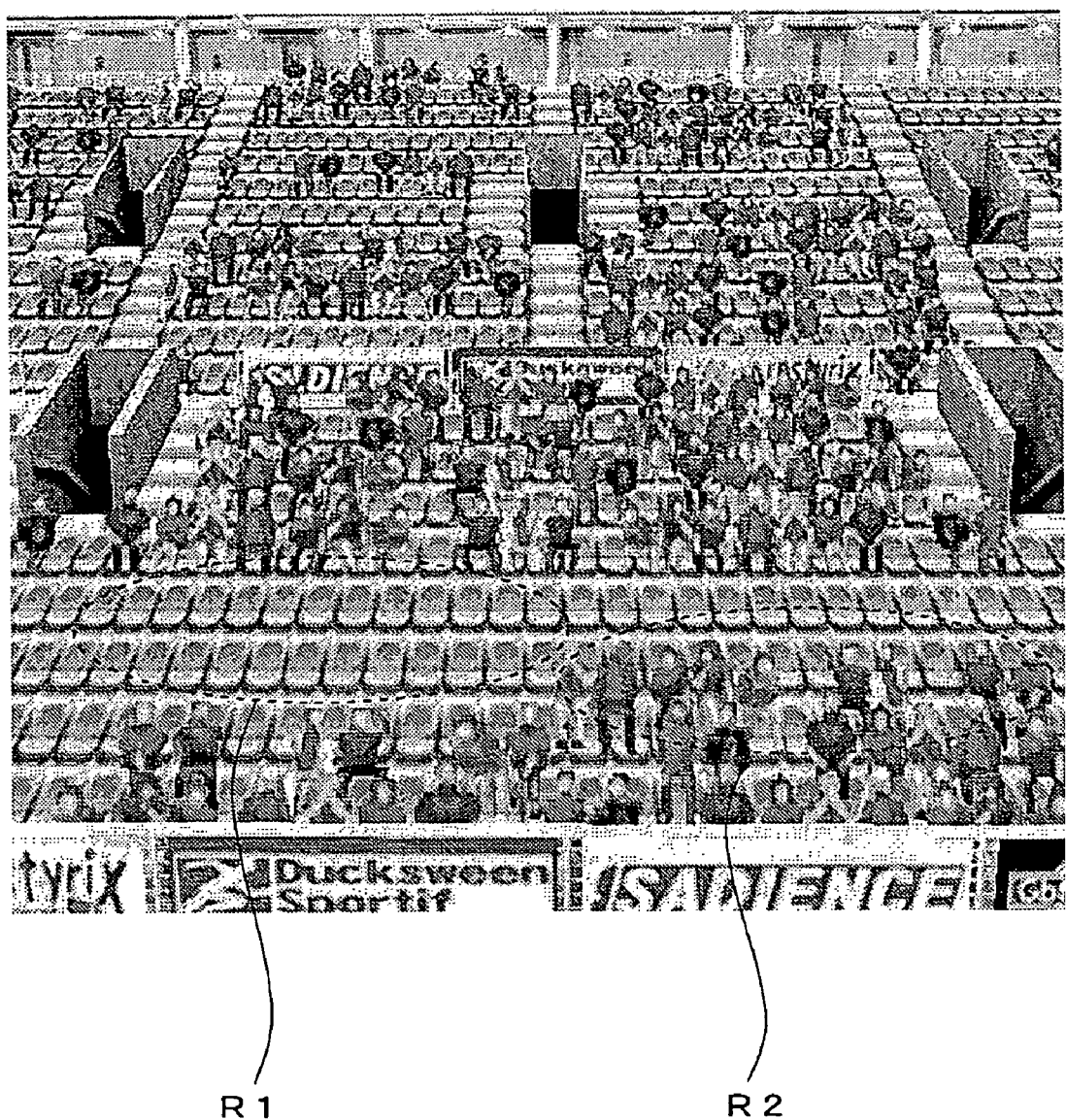
FIG. 16 is a diagram showing an example of a two-dimensional image generated with the image generation unit.

FIG. 16 shows a two-dimensional image showing the spectators' seats of a mid-sized crowd. In these spectators' seats, for instance, the standing-board polygons in area R1 of FIG. 16 are not the target of display, and represent a state where seats are vacant in a relatively broad range. Further, the standing-board polygons in area R2 of FIG. 16 are the target of display, and represent a state of vacant seats existing sparsely by setting "0" occasionally to the α value of the color pallet data.

Figure 17:
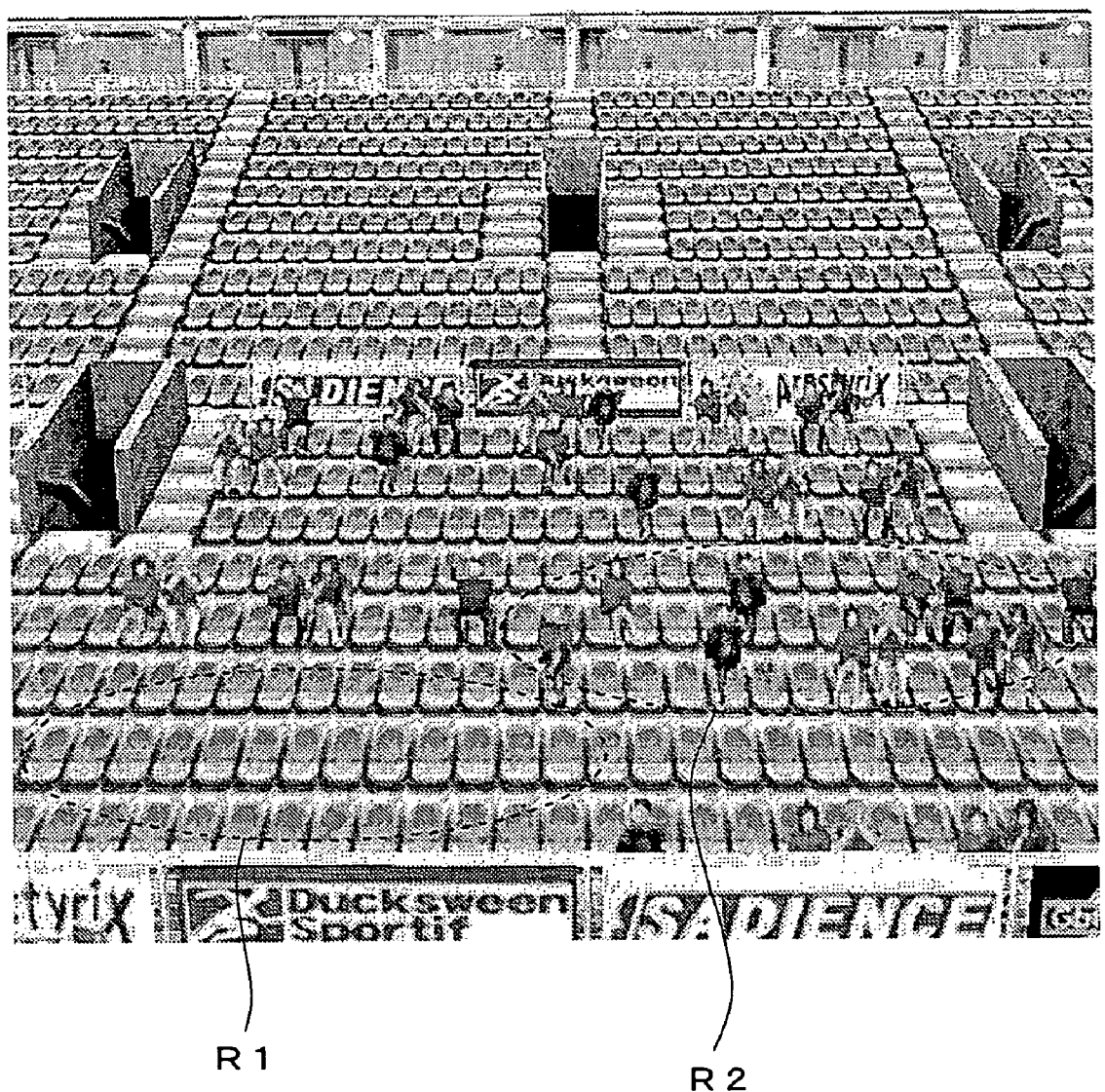
FIG. 17 is a diagram showing an example of a two-dimensional image generated with the image generation unit.

FIG. 17 shows a two-dimensional image showing the spectators' seats of a small crowd. In these spectators' seats, for instance, the standing-board polygons in area R1 of FIG. 16 are not the target of display, and represent a state where seats are vacant in a relatively broad range. Further, the standing-board polygons in area R2 of FIG. 16 are the target of display, and represent a state of vacant seats existing sparsely by setting "0" occasionally to the α value of the color pallet data.

Figure 18:
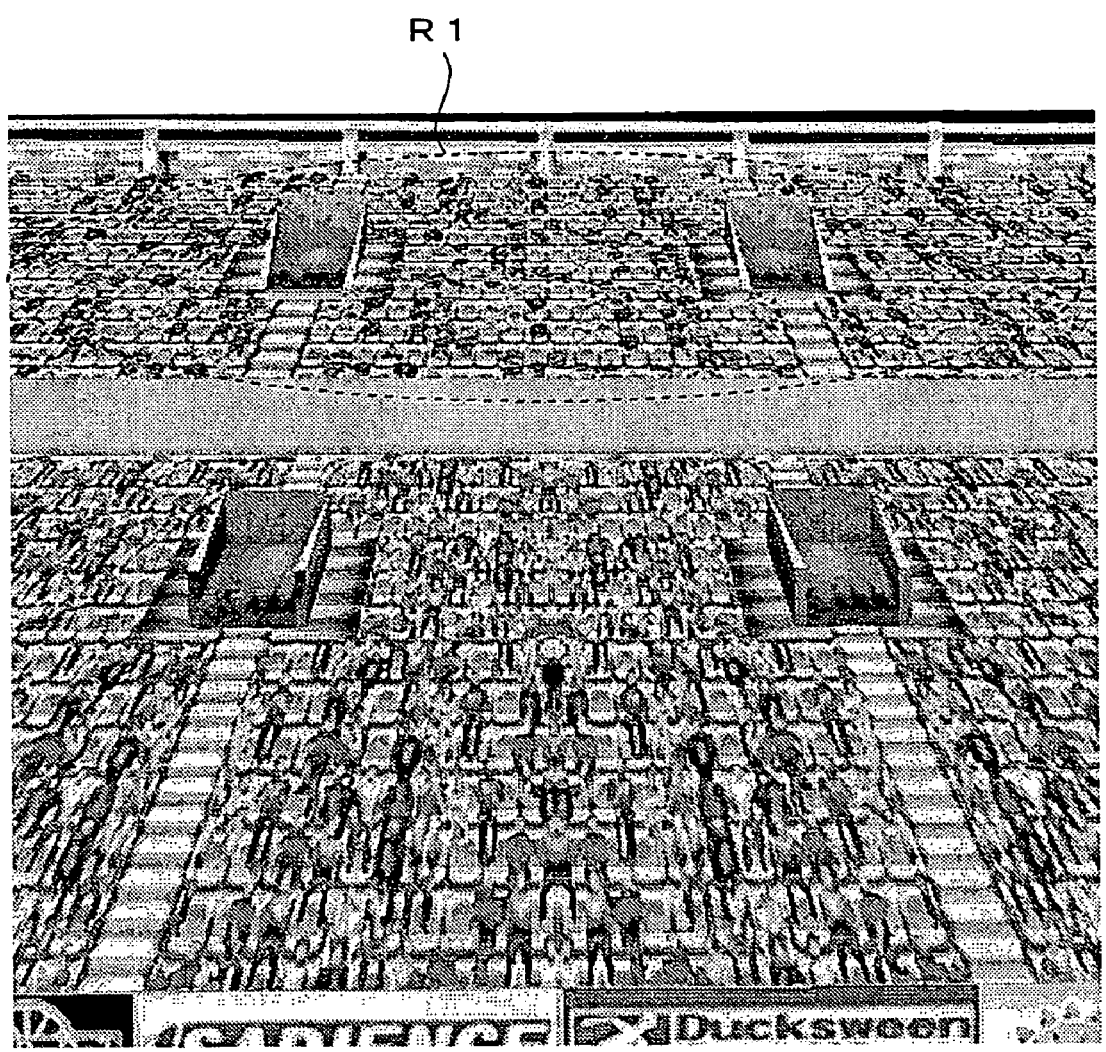
FIG. 18 is a diagram showing an example of a two-dimensional image generated with the image generation unit.

FIG. 18 is a two-dimensional image showing separate spectators' seats from those illustrated in FIG. 15 to FIG. 17. In these spectators' seats, both the front and back spectators' seats are represented with lying-board polygons. Further, for instance, in area R1 of FIG. 18, it is possible to represent the spectators' seats in a state where the home supporters and the general supporters are mixed by respectively setting the color change pallet to a display color corresponding to the home supporters regarding the spectator groups A and B, and to a display color corresponding to the general supporters regarding spectator group C.

Figure 19:
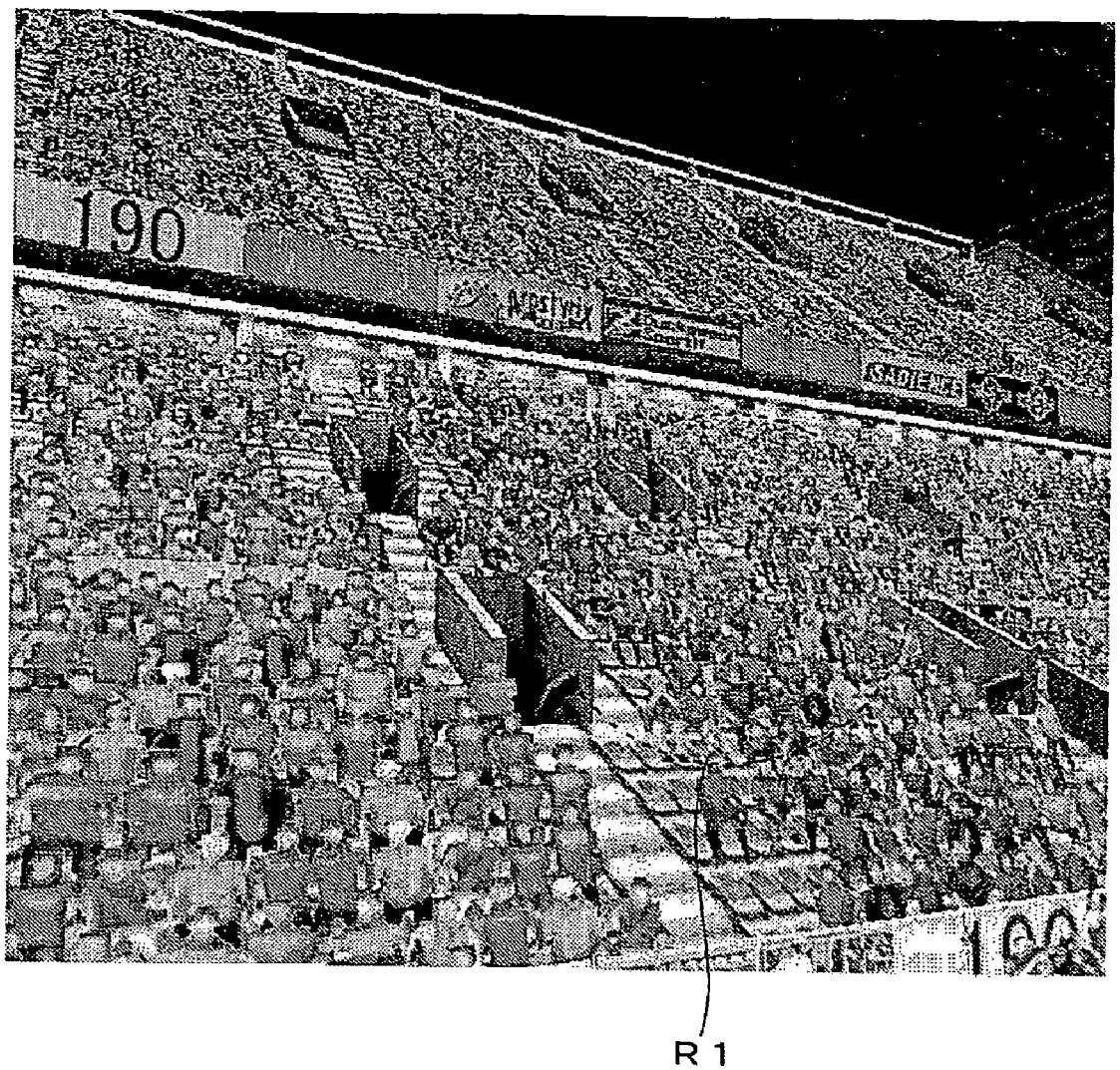
FIG. 19 is a diagram showing an example of a two-dimensional image generated with the image generation unit.

FIG. 19 is a two-dimensional image showing the spectators' seats viewed from a different angle from FIG. 15 to FIG. 18. In these spectators' seats, the lower row of the spectators' seats is represented with the standing-board polygons, and the upper row of the spectators' seats is represented with the lying-board polygons. Further, for instance, in area R1 of FIG. 19, it is possible to represent the spectators' seats in a state where the home supporters and the away supporters are mixed by respectively setting the color change pallet to a display color corresponding to the away supporters regarding the spectator groups A and B, and to a display color corresponding to the home supporters regarding spectator group C.

Further, the processing for determining the color pallet data can also be performed as follows (refer to foregoing step S107).

The pallet data determination unit 34 determines the color pallet data based on the information of the color type included in the stadium data. Here, the color pallet data determined above is the foregoing color change pallet, and a color change pallet reflecting the respective team colors of the home team and the away team. For example, the home team pallet has 32 colors, the away team pallet has 32 colors, and the pallet to be used during the match has 256 colors. Colors 0 to 31 of the pallet to be used during the match is changed to 32 colors of the home team pallet, and colors 128 to 159 are changed to 32 colors of the away team pallet.

Here, the specific contents of the processing for "determining the color pallet data" are as follows. The color pallet data, for example, is determined per floor in each block. Foremost, the total number of spectators in each area is determined (home supporters+away supporters+general supporters). Subsequently, the total number of home supporters, away supporters, and general supporters, respectively, in each area is determined (ratio of home supporters, away supporters, and general supporters). Specifically, the ratio is sought with "reference value+occupant ratio of block−correction value", the total number of spectators is distributed based on such ratio, and the total number of the home supporters, away supporters, and general supporters, respectively in each block, is determined thereby.

Subsequently, the color pallet data per area is determined. Specifically, to "determine the color pallet data per area" means, in a case where all home supporters, away supporters, and general supporters exist in a certain area, to decide the a new color pallet to be transferred when transferring, among the default color pallet (general supporters), a home color (for example, pallet number 1 when the home color is red) to group A, and an away color (for example, pallet number 2 when the away color is blue) to group B. Further, to "determine the color pallet data per area" means, in a case where only home supporters exist in the area, to decide a new color pallet to be transferred when substituting the home color in all groups A to C. Incidentally, when there are no general supporters in the area, since the rewriting of the color pallet is no longer required, there are cases where the color pallet data is automatically determined. When texture is mapped to a plate-shaped polygon based on the determined color pallet to generate an image obtained by performing perspective transformation to the viewpoint coordinate system, and such image is displayed on a monitor, the player will be able to view an image where spectators are displayed across the entire row (refer to FIG. 15).

Subsequently, instead of displaying an image where the "spectators are displayed across the entire row", when displaying an image where the "some spectators are missing in the row" (refer to R2 of FIG. 16), for instance, when all home supporters, away supporters, and general supporters exist in a certain area, between groups A and B, the home color (for example, pallet number 1 when the home color is red) is substituted in group A of an address of the color pallet corresponding to the texture of a portion in which the spectators exist and the away color (for example, pallet number 2 when the away color is blue) is substituted in group B, and a transparent color (for instance, pallet number 0) is transferred to an address of the color pallet corresponding to the texture of the portion in which spectators do not exist in the row (overwriting in the memory). Since the pallet number of general supporters is included in group C as the default color, a transparent color (for instance, pallet number 0) is substituted in an address of the color pallet corresponding to the texture of the portion in which spectators do not exist in the row. Deciding this new color pallet data to be transferred is the meaning of "to decide the color pallet data per area".

Further, when only home supporters exist in a certain area, since the home color is substituted in all groups A to C of the address of the color pallet corresponding to the texture of a portion in which the spectators exist, a transparent color (for instance, pallet number 0) is substituted in an address of the color pallet corresponding to the texture of the portion in which spectators do not exist in the row, and this is referred to as "to decide the new color pallet data to be substituted". Thereby, when texture is mapped to a plate-shaped polygon based on the determined color pallet to generate an image obtained by performing perspective transformation to the viewpoint coordinate system, and such image is displayed on a monitor, the player will be able to view an image where spectators are not displayed in portions of a "transparent color (for instance, pallet number 0)", and an image of other spectators displayed across the row (refer to FIG. 16).

Incidentally, in the case of "lying-board polygons", the following processing differs from the processing of "standing-board polygons". In the case of "standing-board polygons", there is only one default color pallet (color of general supporters set in advance to groups A, B, and C) (100% general supporters only). Whereas in the case of "lying-board polygons", three types of default color pallets are prepared in advance (different pallets for representing the number of spectators in three stages; for instance, three stages of 100%, 70%, and 50% general supporters). Specifically, color pallet data previously allocated with the general supporter color (portions where general supporters exist) and transparency (portions where general supporters do not exist; pallet number "0"; no transparency in the case of (1) of 100%) to be entered into groups A, B and C of the corresponding color pallets so that the number of spectators represented by the texture becomes (1) 100% (FIG. 7: 11 persons×5 rows=55 persons), (2) 70% (39 persons), and (3) 50% (28 persons). Subsequently, one among the three stages is determined based on information regarding the total number of spectators (home supporters+away supporters+general supporters) in each area. Based on the total number of home, away and general supporters (home supporters+away supporters+general supporters) in each area, the home color and away color are overwritten (for example, pallet number 1 is transferred when the color is red and pallet number 2 is transferred when the color is blue) on the portion where the determined default color pallet already exists (portion of the general supporter color). Thereby, when (2) 70% or (3) 50% is selected, unlike in the case of "standing-board polygons" (unlike the case where there is only one default color pallet), processing is facilitated since there is no need to transfer the pallet number of the transparent color to the address corresponding to the portion in which spectators do not exist. By properly using the three types of default pallets, the routine (number of steps) for entering color in the pallet to be actually used will decrease, the processing can be facilitated, and the data configuration can also be simplified.

Incidentally, even in the case of "standing-board polygons", as with the foregoing case, three types, and not just one type, of default color pallet data are prepared in advance, and can be subject to processing as with "lying-board polygons".

According to the present embodiment, it is possible to represent the increase and decrease in the number of spectators by setting the display/nondisplay of polygons by preparing only the texture representing the spectators of a capacity crowd, and the ratio of spectators corresponding respectively to the home supporters, the away supporters, and the general supporters contained in the texture can be freely changed by using the color pallet data even in texture units. Accordingly, it will be possible to display color spectators without increasing the data volume required in generation images.

Further, by arbitrarily setting the α value with a color pallet, it is possible to make some of the spectators contained in the texture not to be displayed, and represent the increase and decrease in the number of spectators in greater detail.

Incidentally, the present invention is not limited to the subject matter of the respective embodiments described above, and can be implemented in various modes within the scope of gist of the present invention. For example, although the foregoing embodiments assumed numerous spectators to view a sports event, the subject of representing spectators is not limited to the above.

Further, the foregoing spectator information setting unit 31 can also reconfigure the spectator information based on the reconfiguration information to be determined according to α change of event in the virtual three-dimensional space. A change of event, for example, would be α change in the game status in a soccer match. Various elements can be considered as changes in the game status, and, for instance, in a home game, the number of home supporters to be set can be reduced when the home team is losing by a huge margin. Moreover, the status of spectators may be changed in the first half and second half of the match (increase of general supporters in the second half, etc.). In addition, when the match is running out of time (for instance, five minutes remaining), the number of spectators cheering for the losing team can be reduced. By arbitrarily setting the reconfiguration information of this kind of spectator information, by updating the image of spectators on a case-by-case basis, it is possible to realize the representation of spectators according to the game status.

Further, in the foregoing embodiments, although the game device was realized by causing a computer containing hardware such as a CPU to execute a prescribed program product, the respective functional blocks in the game device can be realized by using dedicated hardware.

Moreover, in the foregoing embodiments, although a game device was adopted as an example of the image generation device according to the present invention, the applicable scope of the present invention is not limited to a game device. For example, the present invention can also be applied to a simulator device for simulating various experiences of the real world (for instance, driving operation, etc.).

We claim:

1. A program product encoded in a computer-readable medium that when executed by the computer causes the computer to execute processing of mapping a texture containing a plurality of spectators to a plate-shaped polygon arranged in a plurality of areas in a virtual three-dimensional space, and generating an image containing said plurality of spectators;

wherein said program product causes said computer to function as:

a spectator information setting unit for setting spectator information including at least the number of spectators belonging respectively to first and second spectator types, and a color type associated respectively to said first and second spectator types;

a spectator distribution unit for determining the number of spectators belonging to said first and second spectator types to be allocated respectively to said areas in said virtual three-dimensional space;

a mixture ratio determination unit for determining the mixture ratio of said first and second spectator types in each of said areas in said virtual three-dimensional space;

a polygon determination unit for determining a plate-shaped polygon to be arranged in said areas and mapped with a texture containing a plurality of spectators;

a pallet data determination unit for determining color pallet data associated with the color of said texture based on said color type included in said spectator information so that the ratio of said spectators belonging respectively to said first and second spectator types contained in said texture achieves a state according to said mixture ratio;

a mapping unit for mapping said texture defined based on said determined color pallet data to said plate-shaped polygon determined by said polygon determination unit; and an image generation unit for generating a two-dimensional image containing said plurality of spectators obtained by performing perspective projection on a perspective projection plane set in correspondence with a viewpoint of a virtual camera arranged in said virtual three-dimensional space.

2. The program product according to claim 1, wherein said pallet data determination unit further determines contents of said color pallet data according to said number of spectators allocated respectively to said areas so that a part of said spectators contained in said texture will not be displayed.

3. The program product according to claim 1, wherein said spectator information setting unit reconfigures said spectator information based on reconfiguration information determined according to a change of event in said virtual three-dimensional space.

4. The program product according to claim 1, wherein said polygon determination unit determines a plate-shaped polygon to be arranged in said areas and mapped with a texture containing at least a part of spectators to be displayed among a plurality of spectators.

5. The program product according to claim 1, wherein said pallet data determination unit allocates, to said texture to be mapped to said determined plate-shaped polygon, color pallet data showing a transparent color so that a portion of said spectators is not displayed when at least a part of nondisplay-target spectators is contained, and color pallet data showing said color type included in said spectator information so that the ratio of said spectators belonging respectively to said first and second spectator types will reach a state according to said mixture ratio when there are no nondisplay-target spectators.

6. An image processing device for mapping a texture containing a plurality of spectators to a plate-shaped polygon arranged in a plurality of areas in a virtual three-dimensional space, and generating an image containing said plurality of spectators, comprising:
   a spectator information setting unit for setting spectator information including at least the number of spectators belonging respectively to first and second spectator types, and a color type associated respectively to said first and second spectator types;
   a spectator distribution unit for determining the number of spectators belonging to said first and second spectator types to be allocated respectively to said areas in said virtual three-dimensional space;
   a mixture ratio determination unit for determining the mixture ratio of said first and second spectator types in each of said areas in said virtual three-dimensional space;
   a polygon determination unit for determining a plate-shaped polygon to be arranged in said areas and mapped with a texture containing a plurality of spectators;
   a pallet data determination unit for determining color pallet data associated with the color of said texture based on said color type included in said spectator information so that the ratio of said spectators belonging respectively to said first and second spectator types contained in said texture achieves a state according to said mixture ratio;
   a mapping unit for mapping said texture defined based on said determined color pallet data to said plate-shaped polygon determined by said polygon determination unit; and
   an image generation unit for generating a two-dimensional image containing said plurality of spectators obtained by performing perspective projection on a perspective projection plane set in correspondence with a viewpoint of a virtual camera arranged in said virtual three-dimensional space.

7. The image processing device according to claim 6, wherein said pallet data determination unit further determines contents of said color pallet data according to said number of spectators allocated respectively to said areas so that a part of said spectators contained in said texture will not be displayed.

8. The image processing device according to claim 6, wherein said spectator information setting unit reconfigures said spectator information based on reconfiguration information determined according to a change of event in said virtual three-dimensional space.

9. The image processing device according to claim 6, wherein said polygon determination unit determines a plate-shaped polygon to be arranged in said areas and mapped with a texture containing at least a part of spectators to be displayed among a plurality of spectators.

10. The image processing device according to claim 6, wherein said pallet data determination unit allocates, to said texture to be mapped to said determined plate-shaped polygon, color pallet data showing a transparent color so that a portion of said spectators is not displayed when at least a part of nondisplay-target spectators is contained, and color pallet data showing said color type included in said spectator information so that the ratio of said spectators belonging respectively to said first and second spectator types will reach a state according to said mixture ratio when there are no nondisplay-target spectators.

* * * * *

UNITED STATES PATENT AND TRADEMARK OFFICE
CERTIFICATE OF CORRECTION

PATENT NO. : 7,609,260 B2 Page 1 of 1
APPLICATION NO. : 11/634720
DATED : October 27, 2009
INVENTOR(S) : Naoki Sugio and Hideaki Sekiya It is certified that error appears in the above-identified patent and that said Letters Patent is hereby corrected as shown below:

ON THE TITLE PAGE:

In (73) Assignee: change "Kabushiki Kaisha Sega, Tokyo (JP)" to

--Kabushiki Kaisha Sega d/b/a Sega Corporation, Tokyo (JP)--.

Signed and Sealed this

Ninth Day of February, 2010

David J. Kappos
*Director of the United States Patent and Trademark Office*